(12) United States Patent
Moon et al.

(10) Patent No.: US 11,296,632 B2
(45) Date of Patent: Apr. 5, 2022

(54) MOTOR DRIVING APPARATUS AND METHOD THEREOF

(71) Applicant: LG Electronics Inc., Seoul (KR)

(72) Inventors: Jungsong Moon, Seoul (KR); Seongju Kim, Seoul (KR); Donggeun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/929,636

(22) Filed: Jul. 15, 2020

(65) Prior Publication Data

US 2021/0021220 A1 Jan. 21, 2021

(30) Foreign Application Priority Data

Jul. 15, 2019 (KR) .................. 10-2019-0085059

(51) Int. Cl.
*H02P 21/09* (2016.01)
*H02P 21/18* (2016.01)
*H02P 21/22* (2016.01)
*H02P 27/12* (2006.01)

(52) U.S. Cl.
CPC ............. *H02P 21/09* (2016.02); *H02P 21/18* (2016.02); *H02P 21/22* (2016.02); *H02P 27/12* (2013.01); *H02P 2201/13* (2013.01)

(58) Field of Classification Search
CPC .......... H02P 21/09; H02P 21/18; H02P 21/22; H02P 27/12; H02P 2201/13
See application file for complete search history.

(56) References Cited

U.S. PATENT DOCUMENTS

2008/0079377 A1* 4/2008 Williams .......... H02M 7/53875
  318/400.17
2017/0054394 A1* 2/2017 Jung ...................... H02P 27/06

FOREIGN PATENT DOCUMENTS

KR 1020050020825 3/2005
KR 100839074 6/2008
KR 1020170022202 3/2017
(Continued)

OTHER PUBLICATIONS

Translation of KR20190066710A has been attached.*
(Continued)

*Primary Examiner* — Zoheb S Imtiaz
(74) *Attorney, Agent, or Firm* — Fish & Richardson P.C.

(57) ABSTRACT

A motor driving apparatus and a control method thereof, including a dc-link capacitor configured to store DC power, an inverter including a plurality of switching elements and converting the DC power stored in the dc-link capacitor into AC power to output the power to a motor, a dc-link resistor element disposed between the dc-link capacitor and the inverter; and a controller configured to control an operation of the inverter. The controller calculates a phase difference between a first reference voltage vector among a plurality of reference voltage vectors that are preset on the space vector and a voltage command, generates a switching frequency, determines a first operating point located in a dead band that is a one-phase current undetectable area in one switching cycle and a second operating point located at an outer position including a boundary of the dead band, and controls operation of the plurality of switching elements.

18 Claims, 23 Drawing Sheets

(56) References Cited

FOREIGN PATENT DOCUMENTS

KR       20190066710 A  * 12/2017
KR     1020190066710      6/2019

OTHER PUBLICATIONS

Extended European Search Report in EP Appln. No. 20185702.6, dated Nov. 13, 2020, 7 pages.
KR Office Action in Korean Appln. No. 10-2019-0085059, dated Mar. 2, 2021, 12 pages (with English translation).

* cited by examiner

MOTOR DRIVING APPARATUS AND METHOD THEREOF

CROSS-REFERENCE TO RELATED APPLICATIONS

This application claims the priority benefit of Korean Patent Application No. 10-2019-0085059, filed on Jul. 15, 2019, the disclosure of which is incorporated herein by reference.

BACKGROUND OF THE INVENTION

Field of the Disclosure

The present disclosure relates to a motor driving apparatus and a control method thereof and, more particularly, to a motor driving apparatus and a control method thereof, capable of increasing the voltage utilization rate of an inverter in a space-vector pulse width variable control, thus improving the efficiency of the inverter.

Description of the Related Art

A motor driving apparatus is an apparatus configured to drive a motor including a rotor which performs a rotary motion and a stator around which a coil is wound. The motor driving apparatus may be classified into a sensor type motor driving apparatus using a sensor, such as a hall sensor, and a sensorless type motor driving apparatus having no sensor.

A general sensor type motor driving apparatus according to related art 1 (Korean Patent Laid-Open Publication No. 10-2014-0082747) can easily check the rotation speed of the motor or the position of the rotor of the motor through a hall effect sensor.

In contrast, since a sensorless type motor driving apparatus may not check the rotation speed of the motor or the position of the rotor through the hall effect sensor, this apparatus detects a phase current flowing through the motor on the basis of a current flowing between an inverter and the motor, and detects the rotation speed of the motor or the position of the rotor of the motor through calculation based on the phase current.

Particularly, when the case of detecting a current flowing through one shunt resistor and calculating the phase current of each phase flowing through the motor through calculation on the basis of the detected current, thus controlling the operation of the motor, as in related art 2 (Korean Patent Laid-Open Publication No. 10-2011-0030304), is compared with the case of using two or three shunt resistors, related art 2 is problematic in that the detection of the phase current of each phase flowing through the motor may be limited, and thereby it is more complicated to control the operation of the motor.

Nevertheless, for the reason of a reduction in manufacturing cost, the sensorless type motor driving apparatus is widely used in recent years, and various studies are being conducted to improve the efficiency of the inverter and more stably drive the motor in the sensorless type motor driving apparatus.

SUMMARY OF THE INVENTION

The present disclosure provides a motor driving apparatus and a control method thereof, which can expand an operation control area for an inverter, without using a flux weakening operating area, in a space vector pulse width variable control.

The present disclosure also provides a motor driving apparatus and a control method thereof, which can improve a harmonic distortion rate in a space vector pulse width variable control.

The present disclosure also provides a motor driving apparatus and a control method thereof, which improve the voltage utilization rate of an inverter, thus improving the output efficiency of the inverter and a motor.

The present disclosure also provides a motor driving apparatus and a control method thereof, which improve the voltage utilization rate of an inverter and minimize a weak field control, thus reducing an iron loss and a copper loss due to an increase in current.

In order to accomplish the above-described objectives, a motor driving apparatus in accordance with an embodiment of the present disclosure can control so that switching elements of an inverter perform a switching operation, on the basis of a plurality of reference voltage vectors that are preset at predetermined intervals on a space vector, when controlling the operation of the inverter and a motor using one dc-link resistor element.

In an aspect, a motor driving apparatus includes a dc-link capacitor configured to store DC power; an inverter including a plurality of switching elements, and converting the DC power stored in the dc-link capacitor into AC power to output the power to a motor; a dc-link resistor element disposed between the dc-link capacitor and the inverter; and a controller configured to control an operation of the inverter, on the basis of a space vector pulse width variable control, wherein the controller calculates a phase difference between a first reference voltage vector among a plurality of reference voltage vectors that are preset on the space vector and a voltage command, generates a switching frequency on the basis of the calculated phase difference, determines a first operating point located in a dead band that is a one-phase current undetectable area in one switching cycle and a second operating point located at an outer position including a boundary of the dead band, on the basis of a level of the voltage command and the calculated phase difference, and controls operation of the plurality of switching elements, on the basis of the generated switching frequency and the first and second operating points.

In another aspect, a control method of a motor driving apparatus includes an operation of calculating, by a controller, a phase difference between a first reference voltage vector among a plurality of reference voltage vectors preset on a space vector and a voltage command; an operation of generating, by the controller, a switching frequency, on the basis of the calculated phase difference; an operating-point determining operation of determining, by the controller, a first operating point located in a dead band that is a one-phase current undetectable area in one switching cycle and a second operating point located at an outer position including a boundary of the dead band, on the basis of a level of the voltage command and the calculated phase difference; and an operation of controlling an operation of a plurality of switching elements provided in an inverter configured to output AC power to a motor, on the basis of the generated switching frequency and the first and second operating points.

DETAILED DESCRIPTION

Figure 1:
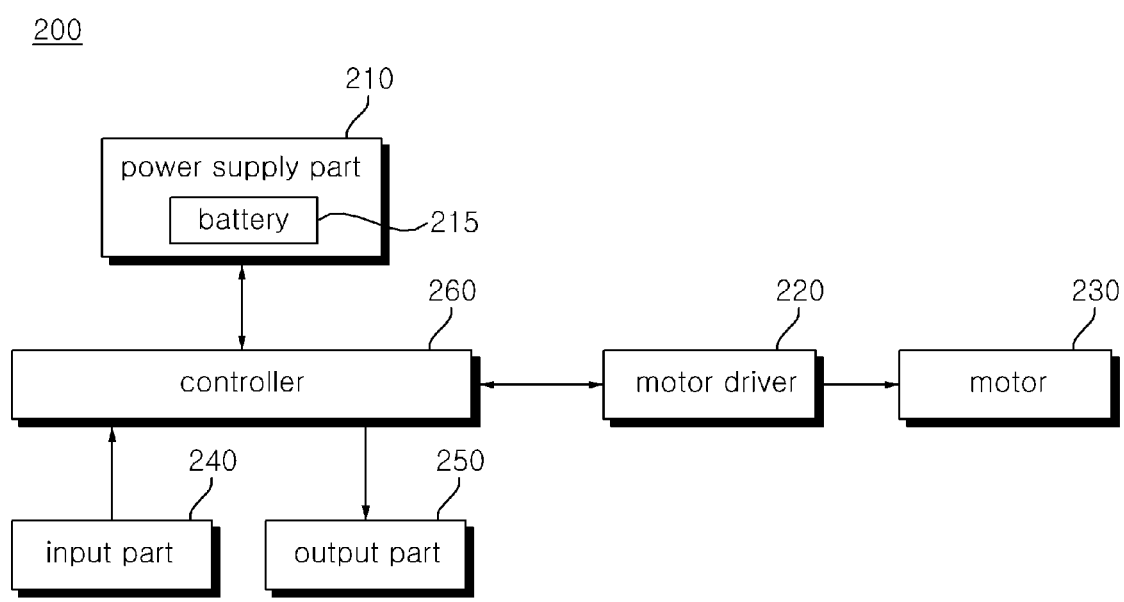
FIG. 1 is an example of an internal block diagram of a motor driving apparatus in accordance with an embodiment of the present disclosure.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components.

Terms "module" and "part" for elements used in the following description are given simply in view of the ease of the description, and do not carry any important meaning or role. Therefore, the "module" and the "part" may be used interchangeably.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

It will be understood that, although the terms "first", "second", etc. may be used herein to describe various elements, these elements should not be limited by these terms. These terms are only used to distinguish one element from another element.

Unless otherwise defined, all terms including technical and scientific terms used herein have the same meaning as commonly understood by one of ordinary skill in the art to which the present disclosure belongs. Further, terms defined in a common dictionary will not be interpreted in an idealized or overly formal sense unless expressly so defined herein.

In the drawings, the thicknesses or the sizes of elements and graphs may be exaggerated, omitted or simplified to more clearly and conveniently illustrate the present disclosure.

FIG. 1 is an example of an internal block diagram of a motor driving apparatus in accordance with an embodiment of the present disclosure.

Referring to FIG. 1, the motor driving apparatus 200 may include, for example, a power supply part 210, a motor driver 220, a motor 230, an input part 240, an output part 250, and/or a controller 260.

For example, the power supply part 210 may supply power to the motor driving apparatus 200.

For example, the power supply part 210 may convert AC power input from commercial AC power into DC power to supply it as the power of the motor driving apparatus 200. For example, the power supply part 210 may be provided with a converter (not shown), and may convert the AC power into the DC power through the converter.

The power supply part 210 may be provided with, for example, a battery 215 storing the DC power. For example, the power supply part 210 may supply the DC power stored in the battery 215 as the power of the motor driving apparatus 200.

For example, the power supply part 210 may convert the commercial AC power into the DC power to store the DC power in the battery 215.

The power supply part 210 may further include a dc-link capacitor (not shown), and store the DC power converted through the converter and/or the DC power supplied from the battery 215 in the dc-link capacitor.

The motor driver 220 may drive, for example, the motor 230. For example, the motor driver 220 may drive the motor 230 on the basis of power supplied from the power supply part 210.

For example, the motor driver 220 may be provided with a plurality of switching elements, include an inverter (not shown) that converts the DC power into a predetermined frequency of AC power and outputs the AC power through the on/off operation of the switching elements, and supply the AC power output from the inverter to the motor 230.

For example, the motor driver 220 may further include a current detector (not shown) that detects a current flowing through each component of the motor driving apparatus 200 and/or a voltage detector (not shown) that detects a voltage applied to each component.

In order to detect the current, the current detector may include, for example, a current sensor, a current transformer (CT), a shunt resistor and the like, and the detected current may be input into the controller 260.

In order to detect the voltage, the voltage detector may include, for example, a resistor element, an operational amplifier (op-amp) and the like, and the detected voltage may be input into the controller 260.

For example, the motor 230 may be driven according to the power supplied from the motor driver 220.

For example, the motor 230 may be driven according to a predetermined frequency of AC power supplied from the motor driver 220. For example, the operation of the motor 230 may be changed according to the level and/or frequency of the power supplied from the motor driver 220.

Examples of the motor 230 may include a Surface-Mounted Permanent-Magnet Synchronous Motor (SMPMSM), an Interior Permanent Magnet Synchronous Motor (IPMSM), a Synchronous Reluctance Motor (SynRM), etc. Among them, each of the SMPMSM and the IPMSM is a Permanent Magnet Synchronous Motor (PMSM) to which a permanent magnet is applied, and the SynRm has no permanent magnet.

For example, the input part 240 may be provided with an input apparatus (e.g. key, touch panel, etc.) that may receive a user input. For example, the input part 240 may include a power key for turning on or off the power of the home appliance 100, an operation key for setting the operation of the motor driving apparatus 200, etc.

For example, the input part 240 may receive the user input through an input device, and transmit a command corresponding to the received user input to the controller 260. For example, the controller 260 may determine the operation mode of the motor driving apparatus 200, on the basis of the user input that is input through the input part 240.

For example, the output part 250 may include a display device such as a display (not shown) or a Light Emitting Diode (LED). For example, the output part 250 may display the power on/off state of the motor driving apparatus 200, an operating condition depending on an operation mode, a message related to error occurrence, etc.

For example, the output part 250 may include an audio device such as a speaker or a buzzer. For example, the output part 250 may output an effect sound according to the power on/off state of the motor driving apparatus 200, an effect sound according to a change in operation mode, and a warning sound for error occurrence.

For example, the controller 260 may be connected to each component provided in the motor driving apparatus 200. For example, the controller 260 may transmit or receive a signal to or from each component of the motor driving apparatus 200, and control the overall operation of each component.

For example, the controller 260 may include a converter controller (not shown) that controls the operation of the converter and/or an inverter controller (not shown) that controls the operation of the inverter. According to various embodiments of the present disclosure, the converter controller and the inverter controller may be included in the same component or separate components.

For example, the controller 260 may control the operation of the motor driver 220. For example, the controller 260 may output a switching control signal for controlling the switching operation of the inverter included in the motor driver 220. Here, the switching control signal may be, for example, a control signal of a pulse width modulation (PWM) having a predetermined duty cycle and frequency.

Meanwhile, the motor driving apparatus 200 according to various embodiments of the present disclosure may control the operation of the motor 230 by the sensorless type in which a component such as a hall sensor for sensing the rotor position of the motor 230 is not provided inside or outside the motor 230.

For example, the controller 260 may calculate the current flowing through the motor 230. For example, the controller 260 may calculate the current flowing through the motor 230 through the current detector.

For example, the controller 260 may calculate the phase current flowing through the motor 230. In this case, when the motor 230 is a three-phase motor, the controller may calculate the three-phase current flowing through the motor 230.

For example, the controller 260 may calculate the rotation speed of the motor 230. For example, the controller 260 may calculate the rotation speed of the motor 230, on the basis of the phase current flowing through the motor 230.

For example, the controller 260 may calculate the position of the rotor of the motor 230. For example, the controller 260 may calculate the position of the rotor of the motor 230, on the basis of the phase current flowing through the motor 230.

Figure 2A:
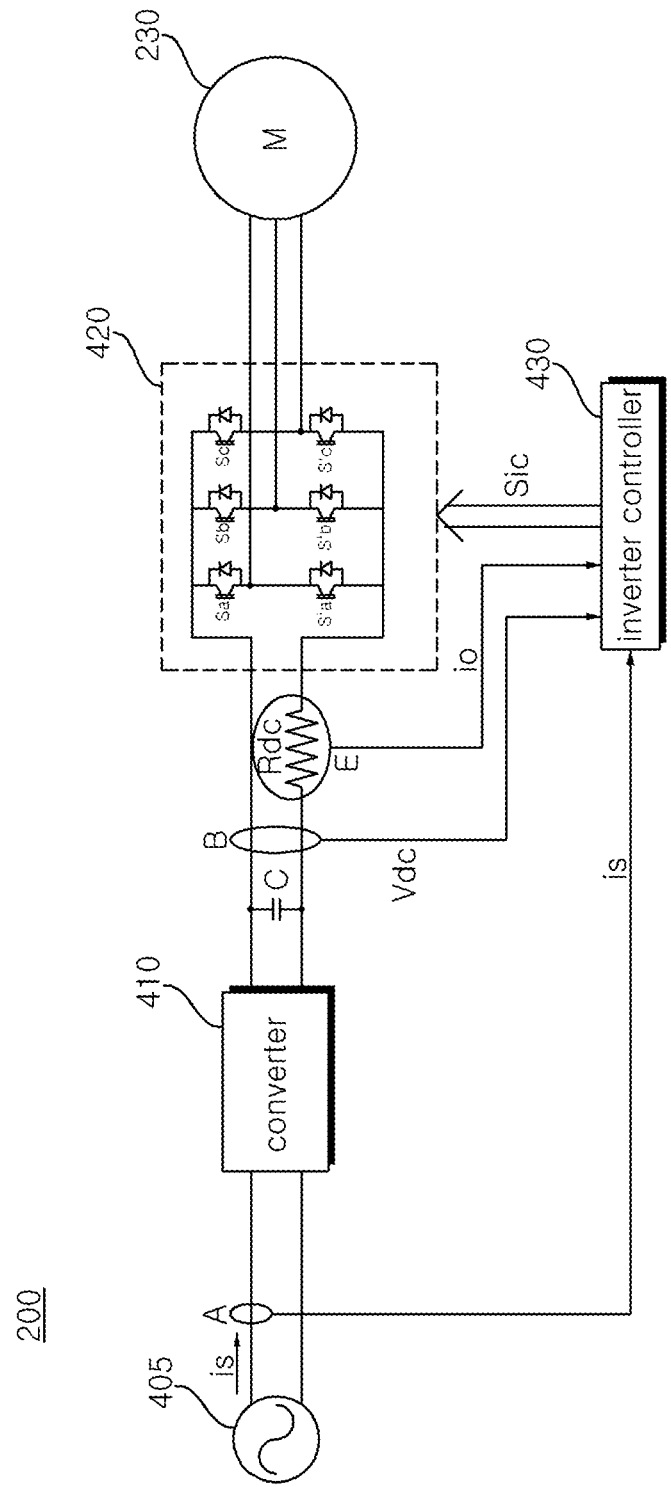
FIG. 2A is an example of an internal circuit diagram of the motor driving apparatus in accordance with the embodiment of the present disclosure.
Figure 2B:
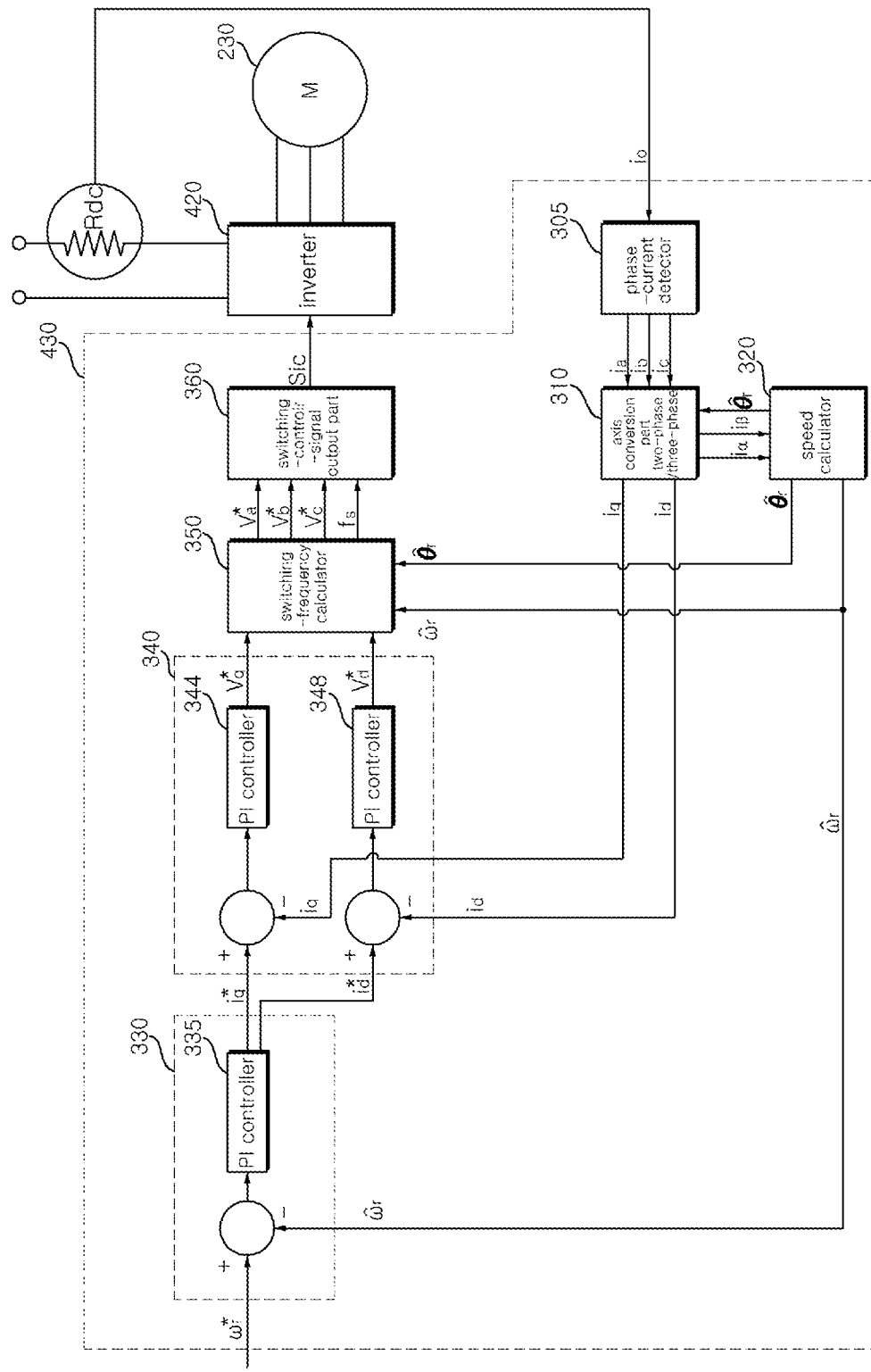
FIG. 2B is an example of an internal block diagram of an inverter controller in accordance with an embodiment of the present disclosure.

FIG. 2A is an example of an internal circuit diagram of the motor driving apparatus in accordance with the embodiment of the present disclosure, and FIG. 2B is an example of an internal block diagram of the inverter controller in accordance with the embodiment of the present disclosure.

Referring to FIG. 2A, the motor driving apparatus 200 may include, for example, a converter 410, a dc-link capacitor C, an inverter 420, a motor 230, and/or an inverter controller 430.

For example, the motor driving apparatus 200 may further include an input current detector A, a dc-link voltage detector B, and/or an output-current detector E.

For example, the converter 410 may commutate input AC power 405 into DC power to output the DC power. Here, the input AC power may be, for example, single-phase AC power or three-phase AC power.

For example, the converter 410 may be provided with a bridge diode. For example, upper-arm diode elements and lower-arm diode elements may be connected, respectively, in series, and each of the upper-arm diode elements and each of the lower-arm diode elements may make one pair. A total of two or three pairs of upper and lower arm diode elements may be connected in parallel.

Meanwhile, the converter 410 may use a half-bridge type of converter to which two switching elements and four diodes are connected, for example. In the case of the three-phase AC power, six switching elements and six diodes may be used.

For example, the dc-link capacitor C may be connected to an output terminal of the converter 410.

The dc-link capacitor C may smoothen and store the DC power supplied from the converter 410. Although the drawing illustrates one element as the dc-link capacitor C, the present disclosure is not limited thereto. That is, a plurality of elements may be provided, so that it is possible to ensure element stability.

For example, the inverter 420 may be connected to dc-links that are both ends of a dc-link capacitor C, convert DC power into AC power, and output the converted AC power to the motor 230.

For example, the inverter 420 may include a plurality of switching elements Sa, S'a, Sb, S'b, Sc, and S'c, and convert smoothened DC power Vdc into three-phase AC power of a predetermined frequency by the on/off operation of each switching element, thus outputting the power to the motor 230.

For example, the inverter 420 may include upper-arm switching elements Sa, Sb, and Sc and lower-arm switching elements S'a, S'b, and S'c. The upper-arm switching elements and the lower-arm switching elements may be connected, respectively, in series, and each of the upper-arm switching elements and each of the lower-arm switching elements may make one pair. A total of three pairs of upper and lower arm switching elements Sa&S'a, Sb&S'b, and Sc&S'c may be connected in parallel. A diode may be connected to each of the switching elements Sa, S'a, Sb, S'b, Sc, and S'c in anti-parallel connection.

For example, the switching elements Sa, S'a, Sb, S'b, Sc, and S'c of the inverter 420 may perform the on/off operation, on the basis of the switching control signal Sic that is output from the inverter controller 430.

For example, the input current detector A may detect an input current is from the input AC power 405. For example, the input current detector A may be connected to a front end of the converter 410. For example, the detected input current is may be input to the inverter controller 430.

For example, a dc-link voltage detector B may detect dc-link voltage Vdc to which DC power is supplied. For example, the detected dc-link voltage Vdc may be input to the inverter controller 430, as a pulse type of discrete signal.

For example, the output-current detector E may be provided with a dc-link resistor element Rdc that is disposed between the dc-link capacitor C and the inverter 420. For example, the detected output current io may be input to the inverter controller 430.

For example, the inverter controller 430 may control the switching operation of the inverter 420.

For example, in order to control the switching operation of the inverter 420, the inverter controller 430 may output the switching control signal Sic to the inverter 420. The output of the control signal Sic will be described with reference to FIG. 2B.

Referring to FIG. 2B, the inverter controller 430 of the motor driving apparatus 200 in accordance with the embodiment of the present disclosure may, for example, include a phase-current detector 305, an axis conversion part 310, a speed calculator 320, a current-command generator 330, a voltage-command generator 340, a switching-frequency calculator 350, and/or a switching-control-signal output part 360.

For example, the phase-current detector 305 may detect a phase current flowing through the motor 230, on the basis of a current io flowing through the dc-link resistor element Rdc that is detected through the output-current detector E.

For example, the phase-current detector 305 may detect a three-phase current flowing through each phase of the motor 230, on the basis of the current io flowing through the dc-link resistor element Rdc. The detection of the phase current will be described with reference to FIGS. 3 to 5D.

FIGS. 3 to 5D are diagrams illustrating a space vector pulse width variable control in accordance with an embodiment of the present disclosure.

Figure 3:
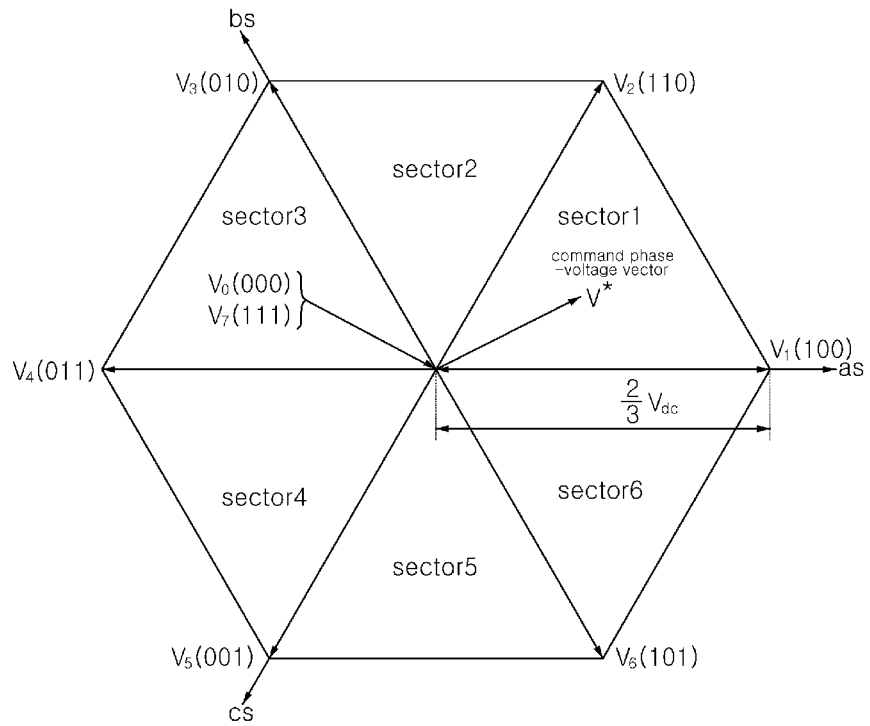
FIGS. 3 to 5D are diagrams illustrating a space vector pulse width variable control in accordance with an embodiment of the present disclosure.

First, FIG. 3 illustrates the space-vector-based voltage vector, according to the switching combination of each switching element Sa, S'a, Sb, S'b, Sc, and S'c in the inverter 420.

Referring to FIG. 3, effective vectors V1(100) to V6(101) corresponding to the switching timing of each switching element Sa, Sb, or Sc in the inverter 420 can be seen. Furthermore, when all of the upper-arm switching elements Sa, Sb, and Sc in the inverter 420 are on, this corresponds to a zero vector of V7(111). When all of the lower-arm switching elements S'a, S'b, and S'c are on, this corresponds to a zero vector of V0(000). That is, two zero vectors are present in the space vector area.

One-shunt method detects a phase current flowing through the motor 230 on the basis of the current flowing through the dc-link resistor element Rdc, when the effective vector is applied, in a control period Ts for one space vector PWM (SVPWM), analog to digital (A/D) converts the detected phase current, and determines the effective vector, thus reconstructing or estimating the phase current.

Here, since the vector is applied within one period Ts, phase currents of two phases may be reconstructed or estimated, and a current of the remaining one phase may be obtained in view of the fact that the sum of currents of three phases is zero.

Figure 4:
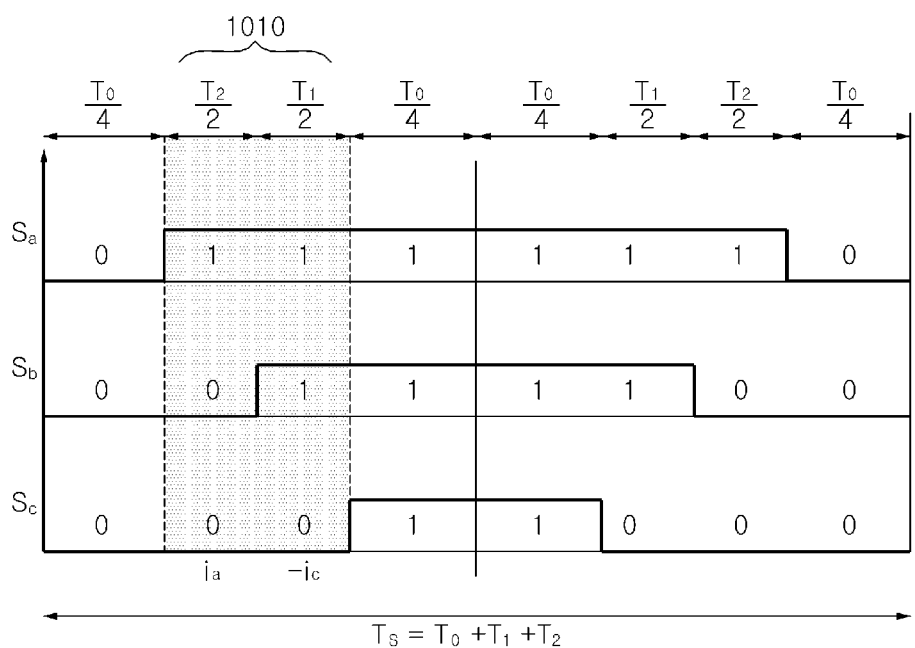

FIG. 4 is a diagram illustrating the switching of each switching element in the inverter 420, in response to the effective vector. Hereinafter, the application period 1010 of the effective vector V1(100) and the effective vector V2(110) will be mainly described.

In FIG. 4, since a first effective vector is V1(100), is current that is the a phase current during the time of T2/2, and -ic current that is the c phase current during the time of T1/2 in a next effective vector V2(110) are detected.

Meanwhile, ib current that is a current of the remaining one phase (b phase) may be calculated through internal calculation in the inverter controller 430. The inverter controller 430 may perform a vector control using the three-phase current thus obtained.

Meanwhile, the basic principle of the current reconstruction using the dc-link resistor element Rdc is to sense the current flowing through the dc-link resistor element Rdc and thereby reconstruct the phase current, in an effective vector section. Here, when a section in which the effective vector is applied is short, it has a problem with the sensing of the current flowing through the dc-link resistor element Rdc.

To be more specific, in the case where the switching element in the inverter 420 is switched, a problem is caused by a settling time Tsettling due to a ringing phenomenon during switching, a dead time Tdead of the inverter 310, and an A/D conversion time TA/D. Thus, in order to detect a normal current, sampling should be performed after the above time elapsed.

As a result, a minimum effective vector application time Tmin for detecting the current flowing through the dc-link resistor element Rdc may be calculated as in the following Equation 1.

$$T_{min} = T_{dead} + T_{settling} + T_{A/D} \qquad \text{[Equation 1]}$$

That is, the minimum effective vector application time Tmin may correspond to the sum of the settling time Tsettling due to the ringing phenomenon when the switching element in the inverter 420 is switched, the dead time Tdead of the inverter 310, and the A/D conversion time TA/D during the sampling.

Meanwhile, FIGS. 5A to 5D are diagrams illustrating the case where the effective vector is applied for a time shorter than the minimum effective vector application time Tmin.

Figure 5A:
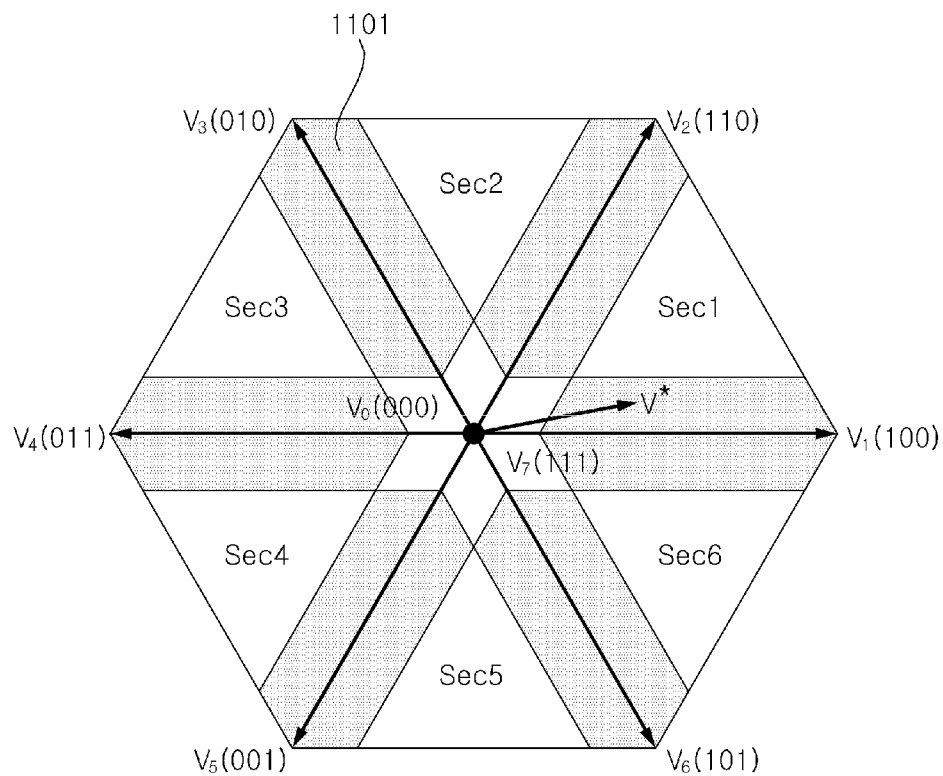
Figure 5B:
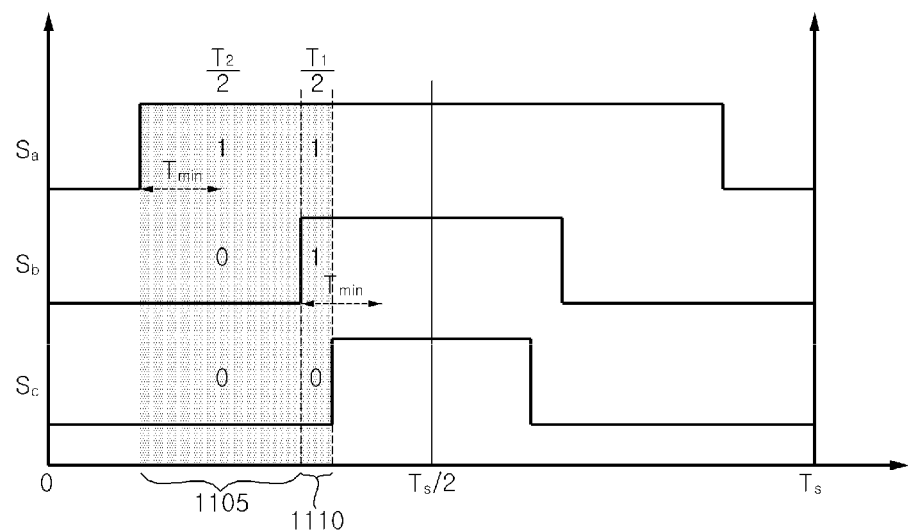

FIGS. 5A and 5B illustrates the case where the application time of one effective vector within one switching period is shorter than the minimum effective vector application time Tmin, in the space vector PWM (SVPWM) hexagon.

Referring to FIG. 5A, in areas around vectors V1 to V6, an area 1101 where it is impossible to detect the current through the dc-link resistor element Rdc may be generated. This area will be referred to as a non-measurable area or a dead band.

Referring to FIG. 5B, a T2/2 section 1105 by the vector V1(100) is greater than the minimum effective vector application time Tmin, but a T1/2 section 1110 by the vector V2(110) is smaller than the minimum effective vector application time Tmin. Thus, it is possible to detect the a phase current in the T2/2 section, but it is impossible to detect the c phase current in the T1/2 section.

Figure 5C:
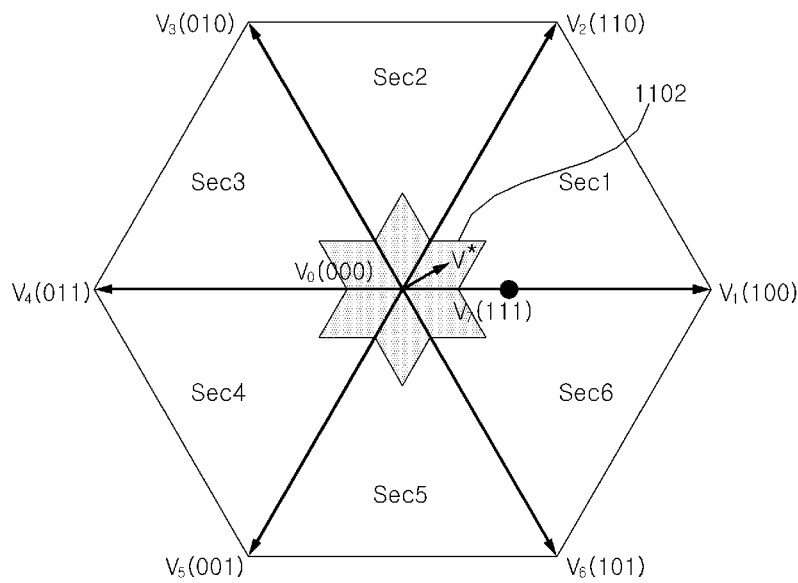
Figure 5D:
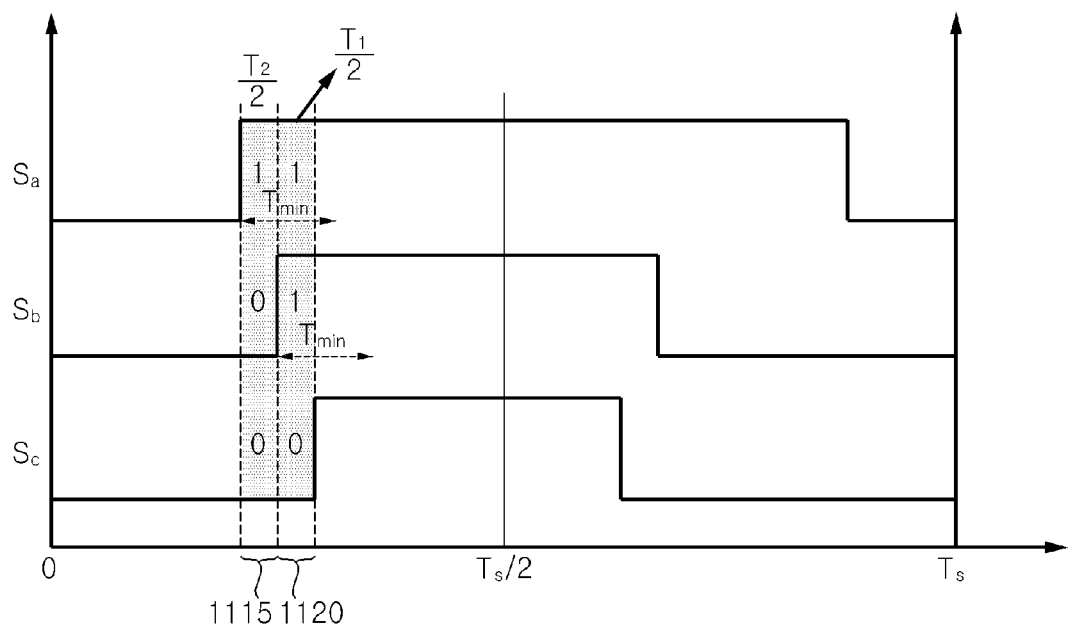

Meanwhile, FIGS. 5C and 5D illustrate the case where the application time of two effective vectors within one switching period is shorter than the minimum effective vector application time Tmin, in the space vector PWM (SVPWM) hexagon.

Referring to FIG. 5C, in an area Ara around the zero vector, an area 1102 where it is impossible to detect the current through the dc-link resistor element Rdc is generated.

Referring to FIG. 5D, both the T2/2 section 1115 by the vector V1(100) and the T1/2 section 1120 by the vector V2(110) are smaller than the minimum effective vector application time Tmin. Thus, it is impossible to detect the a phase current and the c phase current in the T2/2 section and the T1/2 section.

Meanwhile, in the area where it is impossible to detect the current, the motor is not controlled precisely. However, according to various embodiments of the present disclosure, even in the area where it is impossible to detect the current, the operation of the inverter 420 may be controlled. This will be described later with reference to FIGS. 6 to 10B.

Turning back to FIG. 2B, the axis conversion part 310 may, for example, receive three-phase output currents ia, ib, and is detected by the phase-current detector 305, and convert the three-phase output currents into two- phase currents iα and iβ of a stationary coordinate system.

Meanwhile, the axis conversion part 310 may, for example, convert the two-phase currents iα and iβ of the stationary coordinate system into the two-phase currents id and iq of the rotating coordinate system.

The speed calculator 320 may estimate a rotor position of the motor 230, on the basis of the two-phase currents id and iq of the rotating coordinate system, which is axis-converted in the axis conversion part 310.

The speed calculator 320 may, for example, estimate the rotation speed of the motor 230, on the basis of the rotor position.

The speed calculator 320 may, for example, output the calculated position and the calculated speed.

Meanwhile, the current-command generator 330 may, for example, generate a current command value i*q, on the basis of the calculation speed and a speed command value ω*r. For example, the current-command generator 330 may perform PI control in the PI controller 335 on the basis of a difference between the calculation speed and the speed command value ω*r, and generate the current command value i*q.

Although it is shown in the drawing that a q-axis current command value i*q is the current command value, the present disclosure is not limited thereto, and a d-axis current command value i*d may be generated together. Meanwhile, the value of the d-axis current command value i*d may be set to zero.

Meanwhile, for example, the current-command generator 330 may further include a limiter (not shown) that limits the level of the current command value i*q so that it does not exceed an allowable range.

Next, the voltage-command generator 340 may, for example, generate d-axis and q-axis voltage command values v*d and v*q, on the basis of the d-axis and the q-axis currents id and iq that are axis-converted to a two-phase rotating coordinate system in the axis conversion part and the current command values i*d and i*q in the current-command generator 330 or the like.

For example, the voltage-command generator 340 may perform the PI control in the PI controller 344, on the basis of a difference between the q-axis current iq and the q-axis current command value i*q, thus generating the q-axis voltage command value v*q.

Furthermore, the voltage-command generator 340 may, for example, perform the PI control in the PI controller 348, on the basis of a difference between the d-axis current id and the d-axis current command value i*d, thus generating the d-axis voltage command value v*d.

Meanwhile, the value of the d-axis voltage command value v*d may, for example, be set to zero, when the value of the d-axis current command value i*d is set to zero.

Meanwhile, for example, the voltage-command generator 340 may further include a limiter that limits the levels of the d-axis and q-axis voltage command values v*d and v*q so that they do not exceed allowable ranges.

Meanwhile, the generated d-axis and q-axis voltage command values v*d and v*q may be, for example, input to the switching-frequency calculator 350.

The switching-frequency calculator 350 may, for example, output three-phase output voltage command values v*a, v*b and v*c and a switching frequency fs, on the basis of the position and/or the speed calculated in the speed calculator 320 and the d-axis and q-axis voltage command values v*d and v*q. This will be described with reference to FIGS. 6 to 10B.

Figure 6:
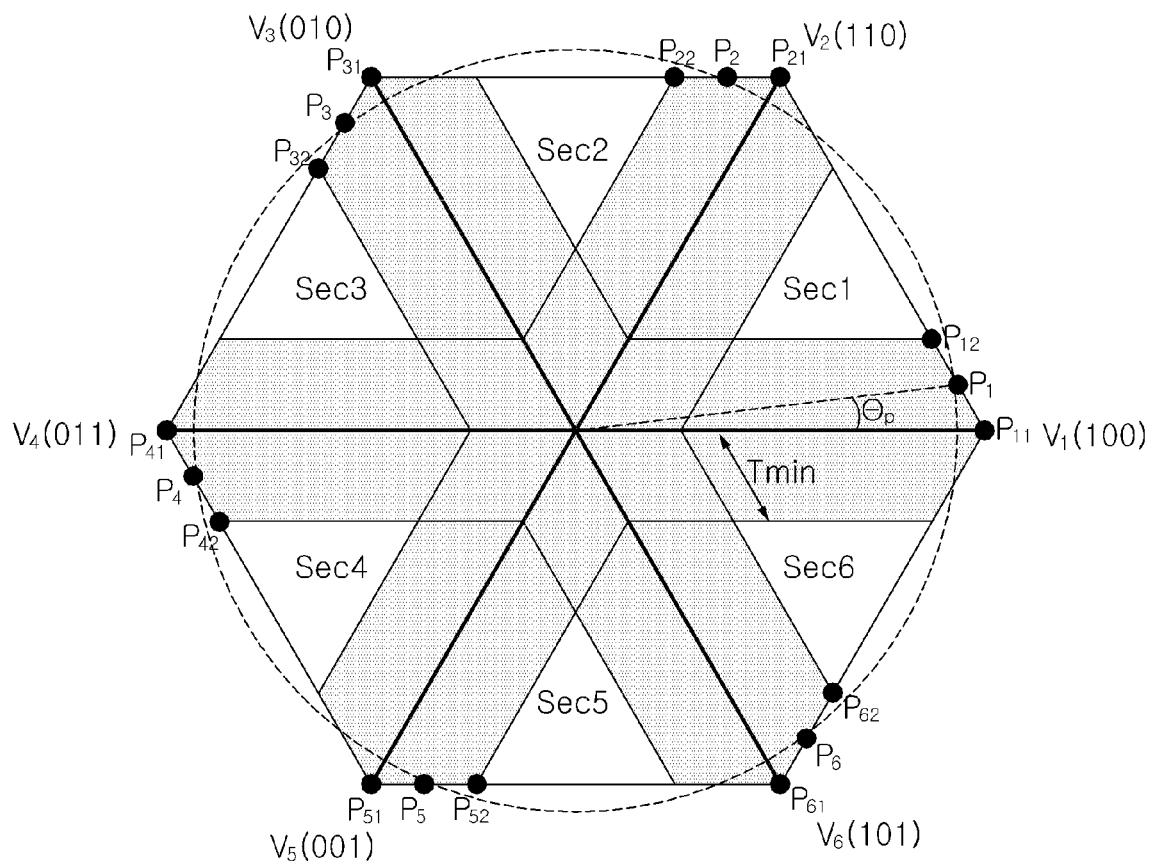
FIG. 6 is a diagram illustrating sampling points that are preset at predetermined intervals on a space vector, in accordance with an embodiment of the present disclosure.

FIG. 6 is a diagram illustrating sampling points that are preset at predetermined intervals on a space vector, in accordance with an embodiment of the present disclosure.

The switching-frequency calculator 350 may, for example, set a plurality of sampling points P1 to P6 at predetermined intervals on the space vector, and output the three-phase output voltage command values v*a, v*b and v*c and the switching frequency fs, on the basis of the plurality of sampling points P1 to P6. Here, the sampling points may, for example, mean points on the space vector, which are a reference for adjusting the phase of the voltage command v*, so as to generate the three-phase output voltage command values v*a, v*b and v*c and the switching frequency fs. Here, the voltage command v* may, for example, mean the d-axis and q-axis voltage command values v*d and v*q generated in the above-described voltage-command generator 340.

For example, the plurality of sampling points P1 to P6 may be set at predetermined intervals on respective sides of a hexagon of a voltage vector diagram.

Meanwhile, for example, the plurality of sampling points P1 to P6 may be set in consideration of the detection of the phase current flowing through the motor 230 and the voltage utilization rate of the inverter 420.

Referring to FIG. 6, the plurality of sampling points P1 to P6 may be set between vertices P11 to P61 of the hexagon of the voltage vector diagram corresponding to the maximum voltage utilization rate and boundary points P12 to P62 located on boundaries of a dead band based on the minimum effective vector application time Tmin.

Here, each of the sampling points P1 to P6 may correspond on average to voltage that is the same as the result obtained by combining the vertices P11 to P61 of the hexagon of the voltage vector diagram and the boundary points P12 to P62 of the dead band.

For example, the switching-frequency calculator 350 may consider the plurality of sampling points P1 to P6 in a preset sequence, when generating the voltage command values v*a, v*b and v*c and the switching frequency fs. For example, the switching-frequency calculator 350 may sequentially consider from the first sampling point P1 to the sixth sampling point P6 during one rotation of the electrical angle of the motor 230, so as to generate the voltage command values v*a, v*b and v*c and the switching frequency fs.

FIGS. 7A to 7D are diagrams illustrating the operation of the motor driving apparatus depending on the voltage command v* and the preset first sampling point P1, in accordance with an embodiment of the present disclosure.

Figure 7A:
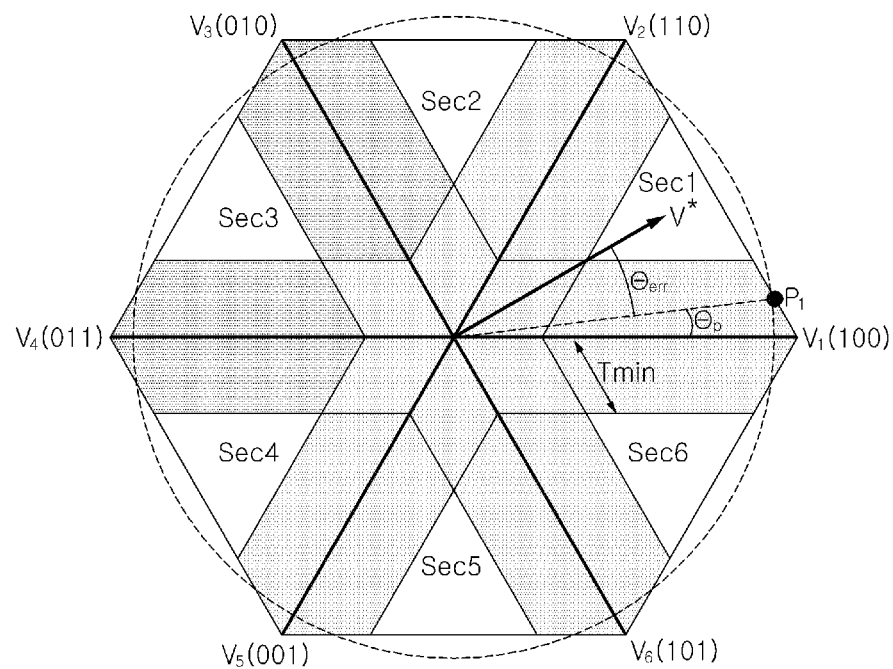
FIGS. 7A to 7D are diagrams illustrating an operation of the motor driving apparatus depending on a voltage command and a preset first sampling point, in accordance with an embodiment of the present disclosure.
Figure 7B:
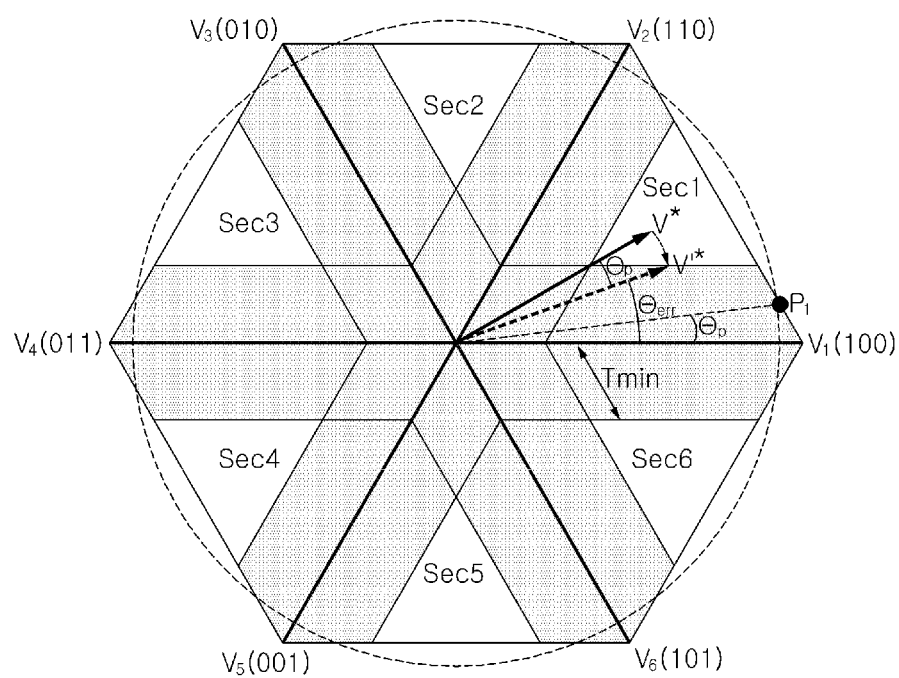

Referring to FIGS. 7A and 7B, in the case of controlling the inverter 420 on the basis of the first sampling point P1 among the plurality of sampling points P1 to P6 in the preset sequence, the switching-frequency calculator 350 may calculate a phase difference θerr between the voltage command v* and the first sampling point P1.

For example, the switching-frequency calculator 350 may rotatably convert the voltage command v* by the phase θp of the first sampling point P1, and calculate a phase difference θerr between the rotatably converted voltage command v'* and the vector V1(100), thus calculating the phase difference θerr between the voltage command v* and the first sampling point P1.

The switching-frequency calculator 350 may, for example, calculate a variation ΔTs of the switching cycle for the switching control of the inverter 420.

For example, as in the following Equation 2, the variation ΔTs of the switching cycle may be calculated on the basis of the rotation speed of the motor 230 and the phase difference θerr.

$$\Delta Ts = \theta_{err}/\omega_r \quad \text{[Equation 2]}$$

Meanwhile, the switching-frequency calculator 350 may, for example, generate the switching frequency fs on the basis of the variation ΔTs of the switching cycle.

For example, as in the following Equation 3, on the basis of a previous switching cycle Ts[n−1] and the variation ΔTs of the switching cycle, the switching cycle Ts[n] for the first sampling point P1 may be calculated, and the switching frequency fs corresponding to the switching cycle Ts[n] may be generated.

$$Ts[n] = Ts[n-1] + \Delta Ts \quad \text{[Equation 3]}$$

Figure 7C:
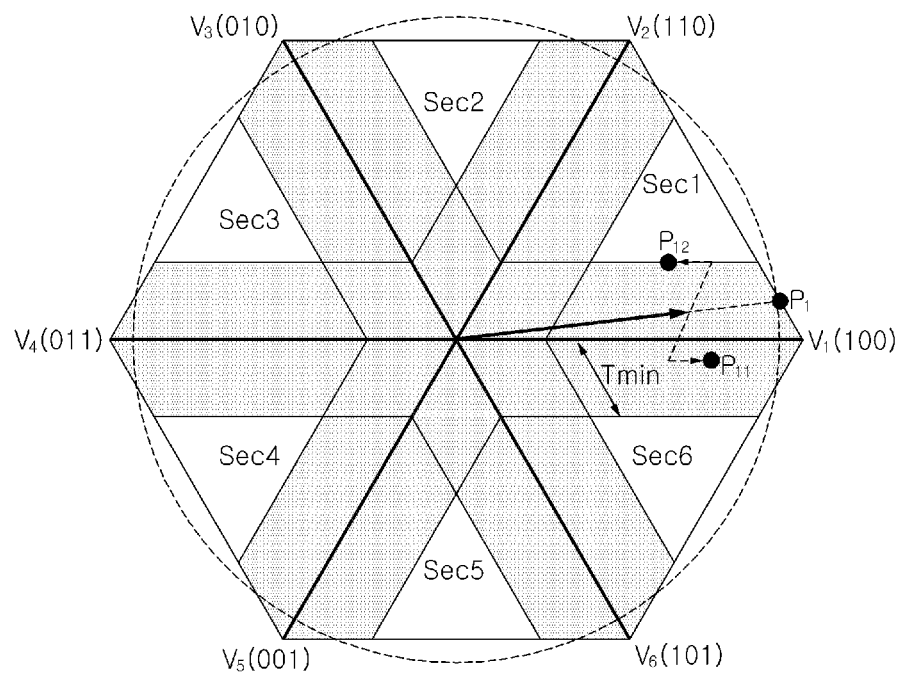

Meanwhile, referring to FIG. 7C, the switching-frequency calculator 350 may rotatably convert the voltage command v* by the calculated phase difference θerr to correspond to the first sampling point P1, and may determine two operating points P11 and P12 in consideration of the level of the voltage command v* and the minimum effective vector application time Tmin.

Here, any one of the two operating points may correspond to the boundary point P12 of the dead band, and the remaining one P11 of the two operating points may correspond to a vector that may on average make the same voltage as the vector that is rotatably converted from the voltage command v* by the phase difference θerr through combination with the boundary point P12 of the dead band.

Figure 7D:
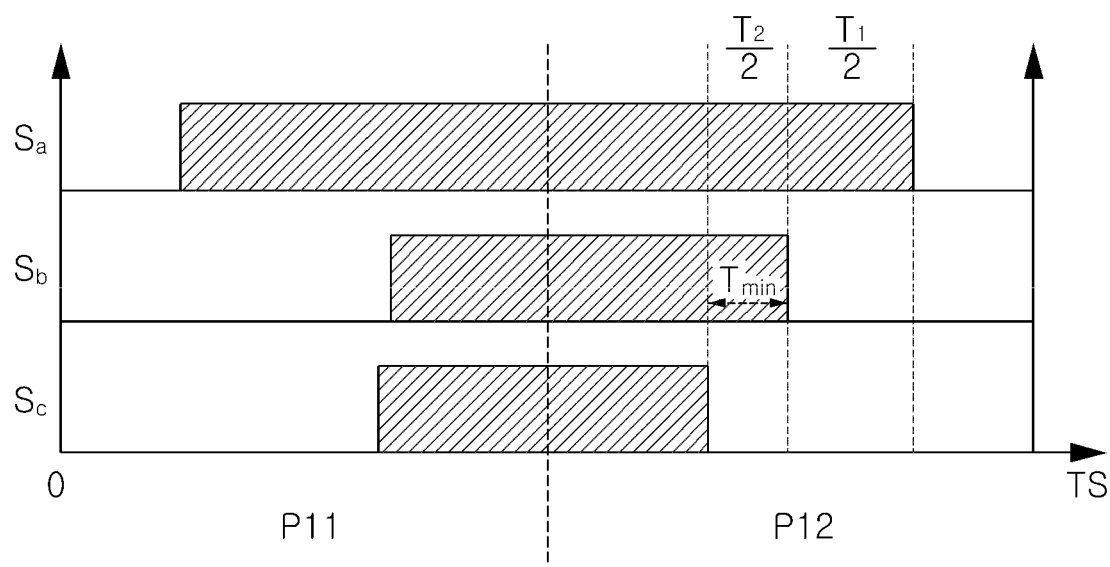

Referring to FIG. 7D, it can be seen that the first operating point P11 is located in the dead band, so that it is possible to detect the a phase of current but it is impossible to detect the b phase of current. Therefore, it can be seen that it is also impossible to detect the c phase of current.

However, since the second operating point P12 is located at the boundary of the dead band, it can be seen that the T2/2 section by the vector V2(110) corresponds to the minimum effective vector application time Tmin, and the T1/2 section by the vector V1(100) is larger than the minimum effective vector application time Tmin. Therefore, it is possible to detect the c phase of current in the T2/2 section, to detect the a phase of current in the T1/2 section, and to detect the b phase of current, on the basis of the two detected phases of currents.

For example, the switching-frequency calculator 350 may generate the voltage command values v*a, v*b, and v*c corresponding to the two operating points P11 and P12 and the switching frequency fs to output the voltage command values and the switching frequency to the switching-control-signal output part 360.

Meanwhile, the inverter controller 430 may, for example, perform the switching control of the inverter 420 according to the first sampling point P1 among the plurality of sampling points P1 to P6 in a preset sequence, and then control the operation of the inverter 420 on the basis of the second sampling point P2.

FIGS. 8A to 8D are diagrams illustrating an operation of the motor driving apparatus depending on a voltage command v* and a preset second sampling point P2, in accordance with an embodiment of the present disclosure. Details that have been already described in FIGS. 7A to 7D will be omitted herein.

Figure 8A:
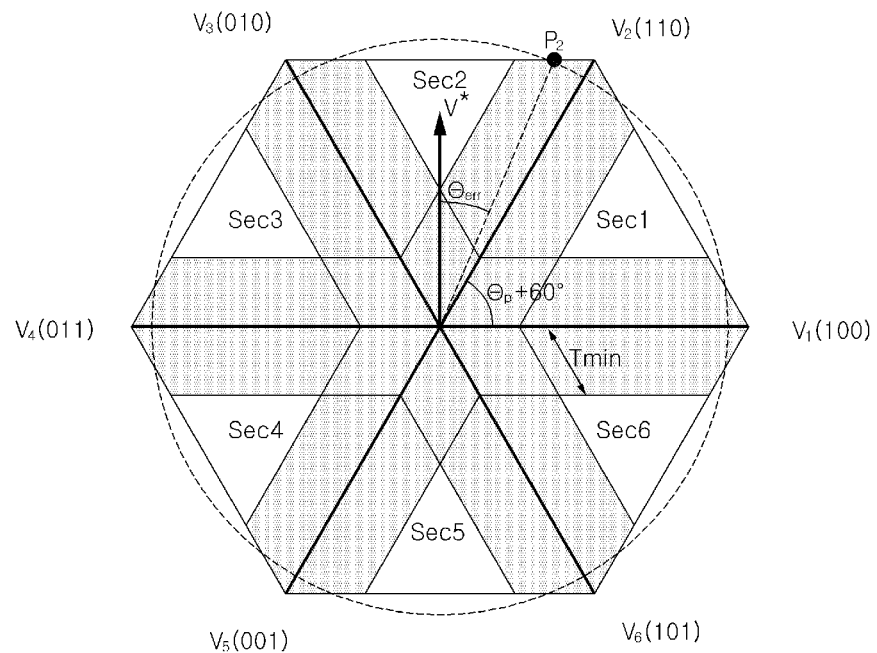
FIGS. 8A to 8D are diagrams illustrating an operation of the motor driving apparatus depending on a voltage command and a preset second sampling point, in accordance with an embodiment of the present disclosure.
Figure 8B:
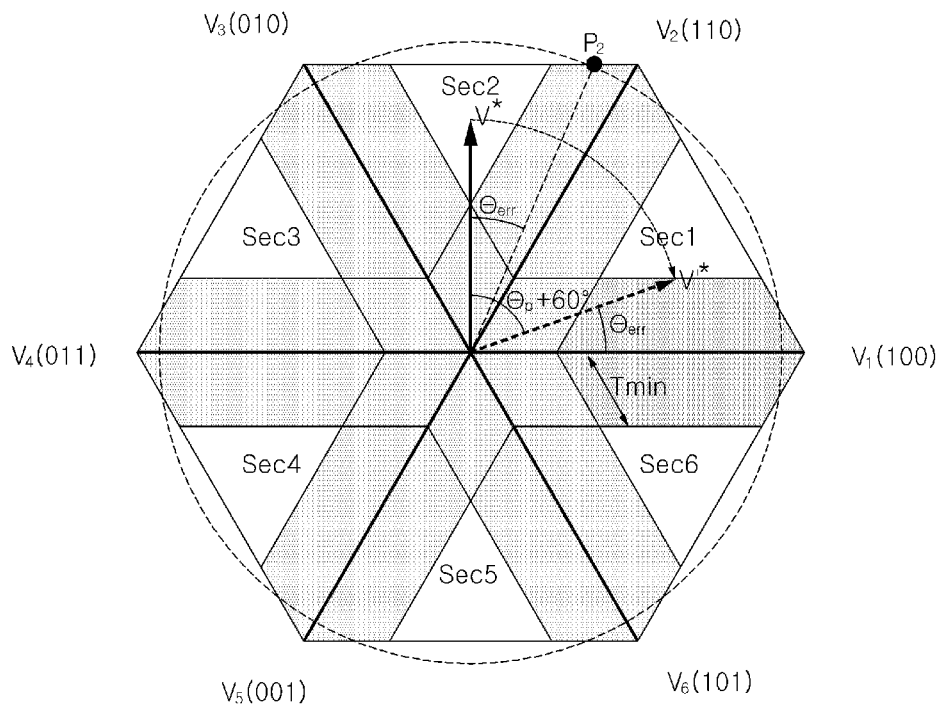

Referring to FIGS. 8A and 8B, the switching-frequency calculator 350 may, for example, calculate a phase difference θerr between the voltage command v* and the second sampling point P2 among the plurality of sampling points P1 to P6.

For example, the switching-frequency calculator 350 may rotatably convert the voltage command v* by the phase (θp+60°) of the first sampling point P1, and calculate the phase difference θerr between the rotatably converted voltage command v'* and the vector V1(100), thus calculating the phase difference θerr between the voltage command v* and the second sampling point P2.

The switching-frequency calculator 350 may, for example, calculate the variation ΔTs of the switching cycle for the switching control of the inverter 420, and generate the switching frequency fs, on the basis of the variation ΔTs of the switching cycle.

Figure 8C:
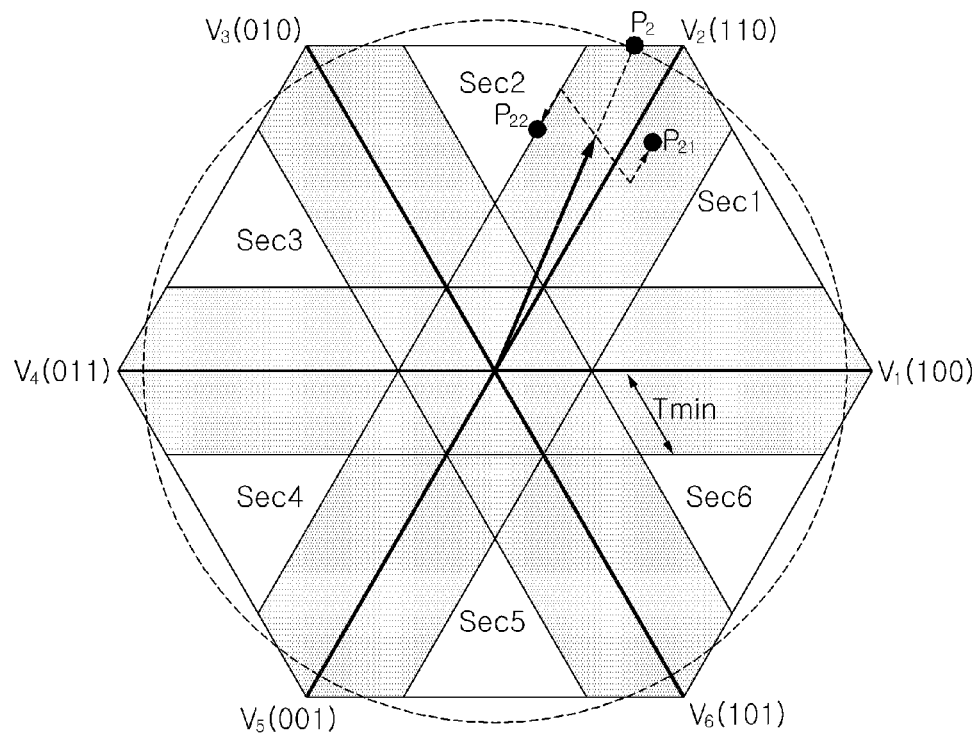

Meanwhile, referring to FIG. 8C, the switching-frequency calculator 350 may rotatably convert the voltage command v* by the calculated phase difference θerr to correspond to the second sampling point P2, and determine two operating points P21 and P22 in view of the level of the voltage command v* and the minimum effective vector application time Tmin.

Here, any one of the two operating points may correspond to the boundary point P22 of the dead band, and the remaining one P21 of the two operating points may correspond to a vector that may on average make the same voltage as the vector that is rotatably converted from the voltage command v* by the phase difference θerr through combination with the boundary point P22 of the dead band.

Figure 8D:
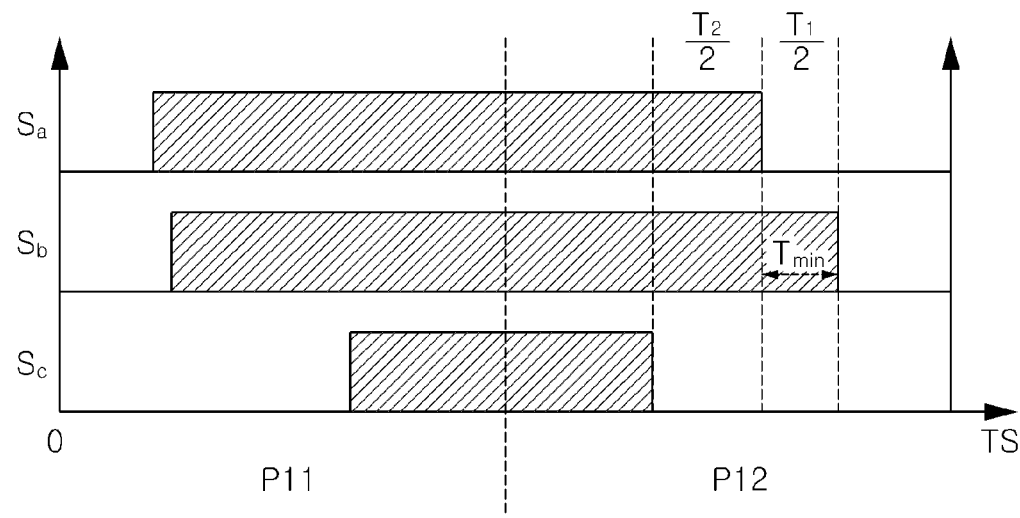

Referring to FIG. 8D, it can be seen that the first operating point P21 is located in the dead band, so that it is possible to detect the c phase of current but it is impossible to detect the a phase of current. Therefore, it can be seen that it is also impossible to detect the b phase of current.

However, since the second operating point P22 is located at the boundary of the dead band, it can be seen that the T1/2 section by the vector V3(010) corresponds to the minimum effective vector application time Tmin, and the T2/2 section by the vector V2(100) is larger than the minimum effective vector application time Tmin. Therefore, it is possible to detect the b phase of current in the T1/2 section, to detect the c phase of current in the T2/2 section, and to detect the a phase of current, on the basis of the two detected phases of currents.

Meanwhile, the switching-control-signal output part 360 may, for example, generate and output the switching control signal Sic depending on the pulse width modulation (PWM) method, on the basis of the switching frequency fs and the three-phase output voltage command values v*a, v*b, and v*c output from the switching-frequency calculator 350.

For example, the switching-control-signal output part 360 may generate and output the switching control signal Sic depending on the pulse width modulation (PWM) method corresponding to two operating points P11 and P12, on the basis of the switching frequency fs and the three-phase output voltage command values v*a, v*b, and v*c generated based on the first sampling point P1.

The switching control signal Sic may, for example, convert an inverter switching signal Si in a gate driver (not shown), and be input to a gate of each switching element in the inverter 420. For example, the respective switching elements Sa, S'a, Sb, S'b, Sc, and S'c provided in the inverter 420 may perform the switching operation by the inverter switching signal Si.

As such, the inverter controller 430 may control the operation of the plurality of switching elements Sa, S'a, Sb, S'b, Sc, and S'c provided in the inverter 420, by sequentially considering the plurality of sampling points P1 to P6 that are preset at predetermined intervals on the space vector, according to a preset sequence.

Figure 9A:
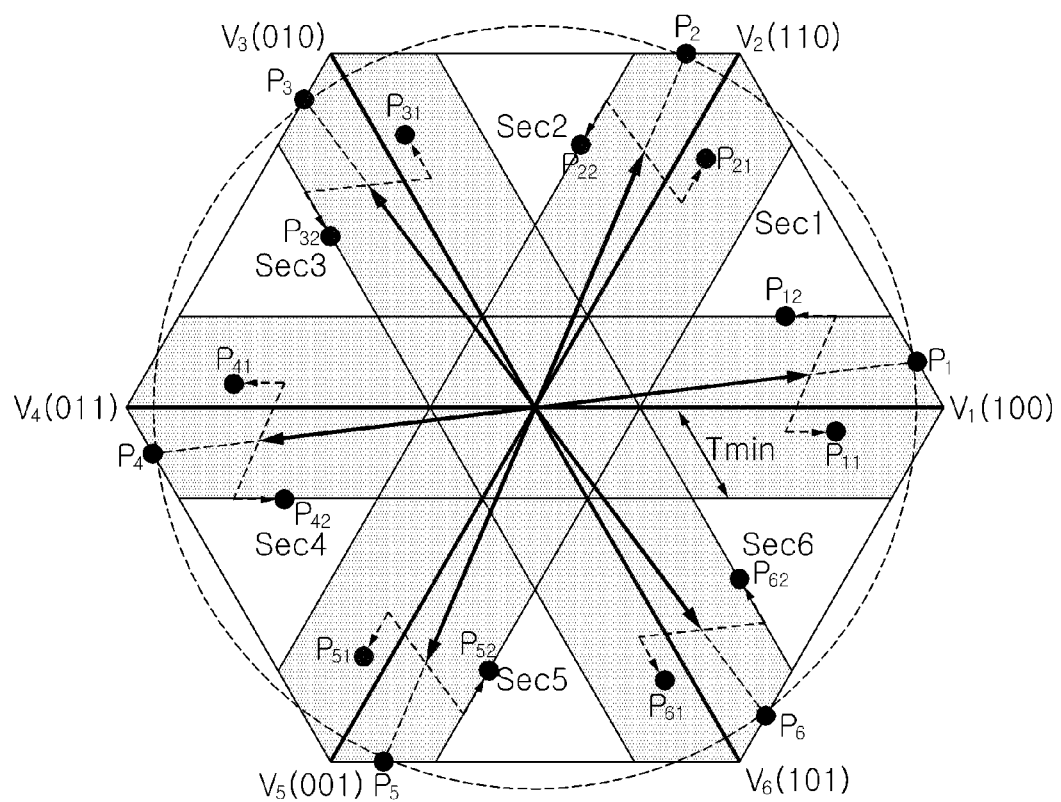
FIGS. 9A to 9C are diagrams illustrating an operation of the motor driving apparatus depending on a voltage command and a preset plurality of sampling points, in accordance with an embodiment of the present disclosure.
Figure 9B:
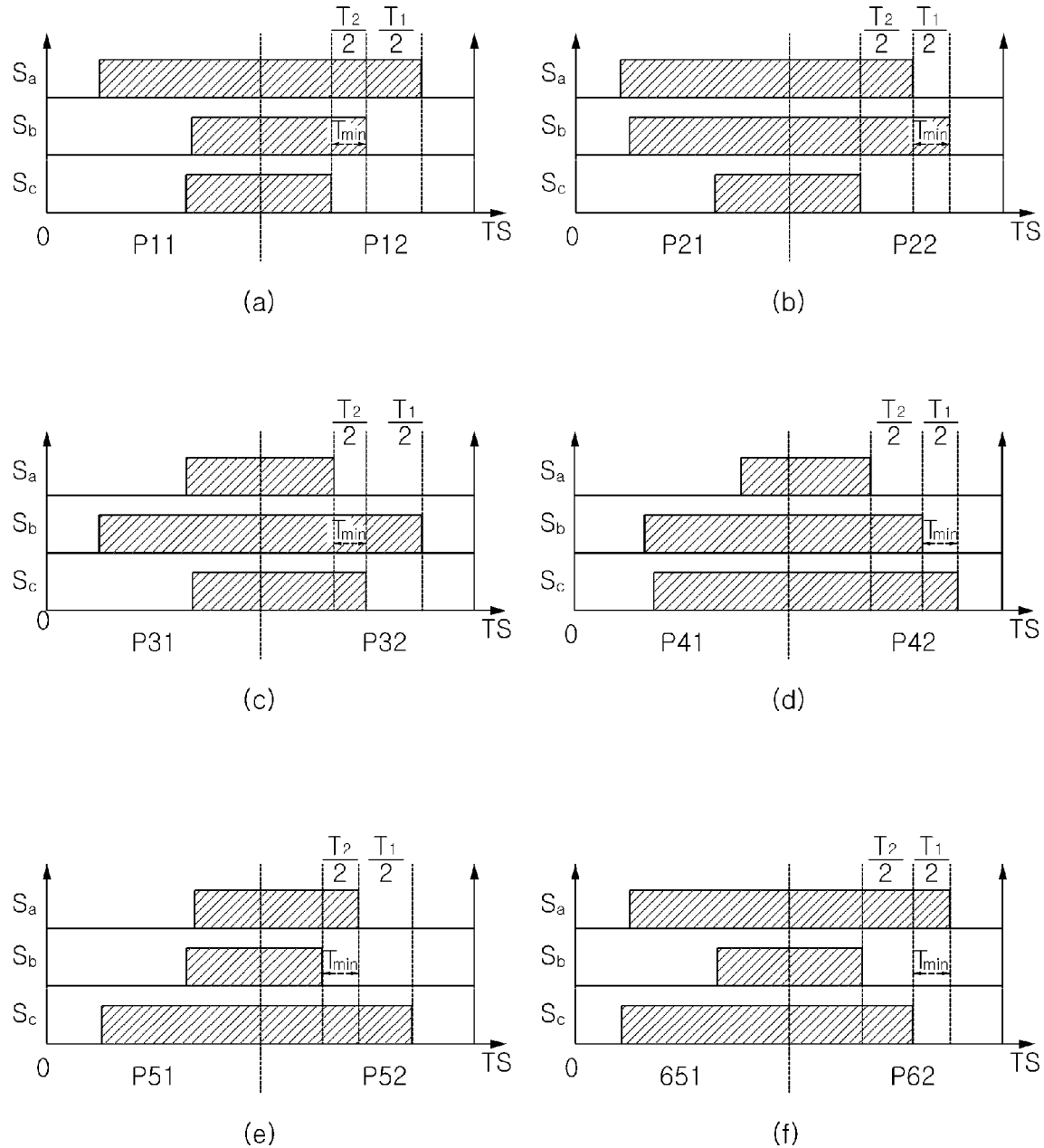
Figure 9C:
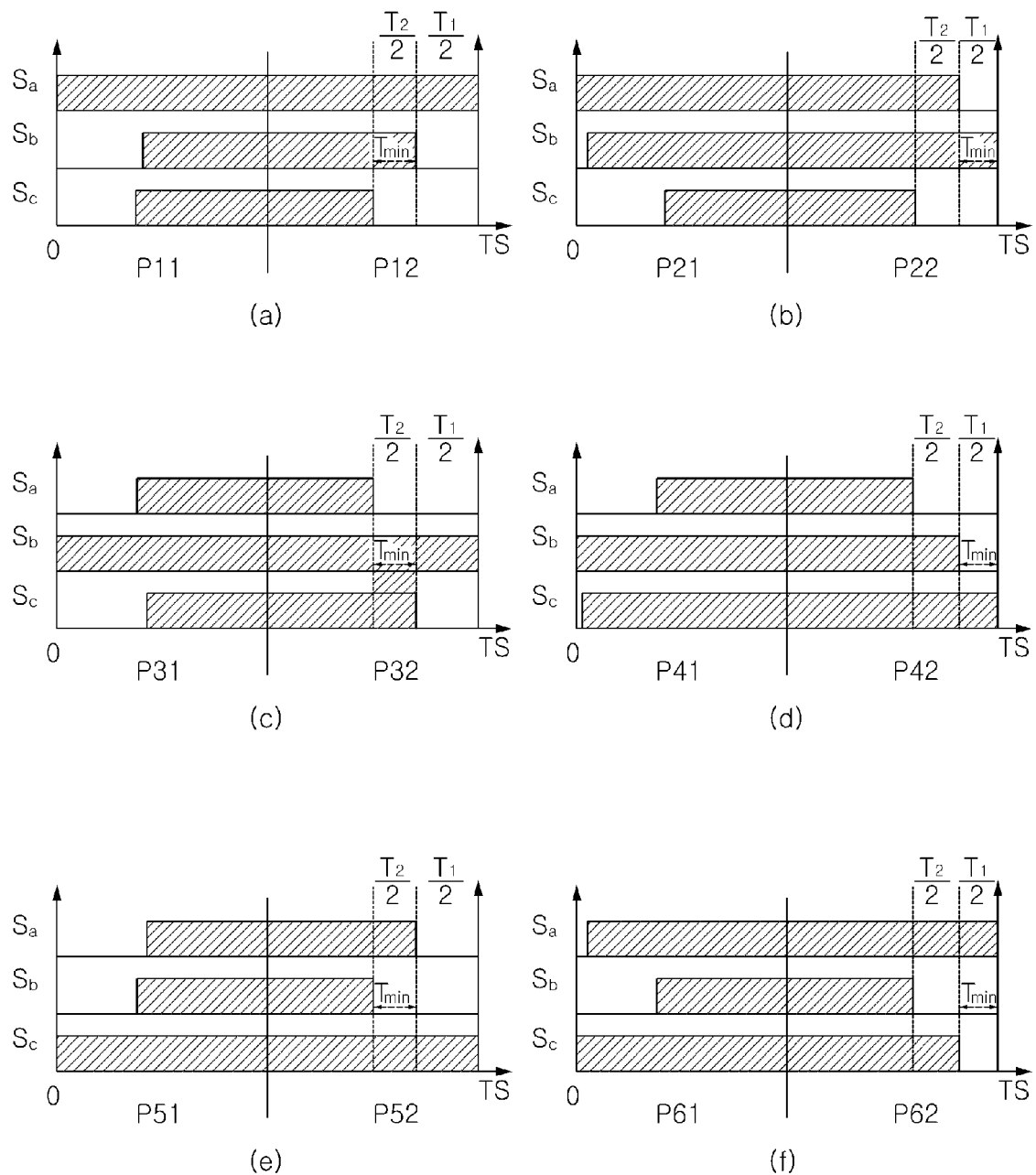

FIGS. 9A to 9C are diagrams illustrating an operation of the motor driving apparatus depending on a voltage command v* and a preset plurality of sampling points P1 to P6, in accordance with an embodiment of the present disclosure.

Referring to FIG. 9A, for example, the inverter controller 430 may sequentially determine a plurality of operating points P11 to P62 for the voltage command v*, on the basis of each of the plurality of sampling points P1 to P6.

Meanwhile, for example, the inverter controller 430 may sequentially generate and output the switching control signal Sic depending on the pulse width modulation (PWM) method corresponding to the plurality of operating points P11 to P62, according to a preset sequence, thus controlling the operation of the plurality of switching elements Sa, S'a, Sb, S'b, Sc, and S'c provided in the inverter 420.

Referring to (a), (c) and (e) of FIG. 9B, it can be seen that the T1/2 section is larger than the minimum effective vector application time Tmin, and the T2/2 section corresponds to the minimum effective vector application time Tmin.

Meanwhile, referring to (b), (d) and (f) of FIG. 9B, it can be seen that the T2/2 section is larger than the minimum effective vector application time Tmin, and the T1/2 section corresponds to the minimum effective vector application time Tmin.

Meanwhile, referring to FIG. 9C, it can be seen that the a phase is not switched and only the b phase and the c phase are switched, among three phases, in one cycle Ts corresponding to the operating point P12 and the operating point P21, and it can be seen that the b phase is not switched and only the a phase and the c phase are switched, among three phases, in one cycle Ts corresponding to the operating point P22 and the operating point P31.

As such, the inverter controller 430 may control the operation of the plurality of switching elements Sa, S'a, Sb, S'b, Sc, and S'c provided in the inverter 420, according to discontinuous voltage modulation in which only two phases among three phases are switched in one cycle Ts.

Meanwhile, the inverter controller 430 may, for example, control the operation of the plurality of switching elements Sa, S'a, Sb, S'b, Sc, and S'c provided in the inverter 420, according to a maximum voltage utilization rate. This will be described with reference to FIGS. 10A and 10B.

Figure 10A:
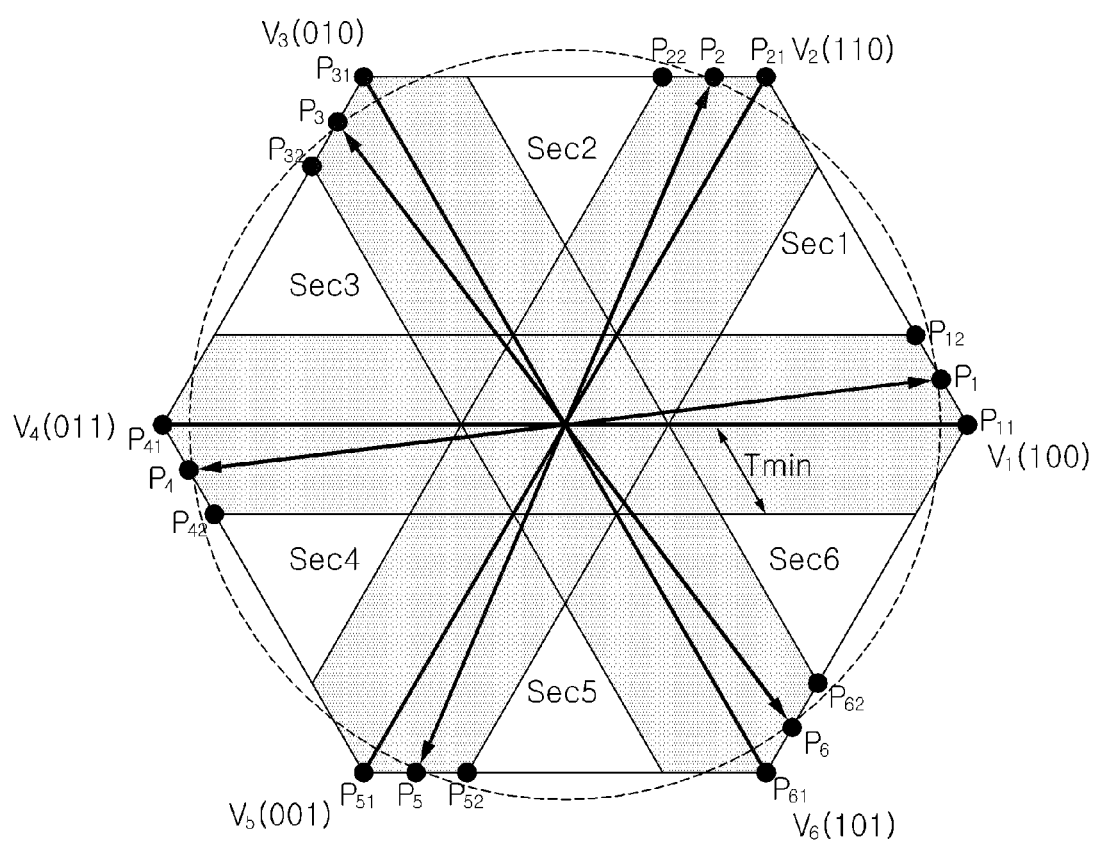
FIGS. 10A and 10B are diagrams illustrating an operation of the motor driving apparatus depending on a voltage command and a preset sampling point, in connection with a maximum voltage utilization rate, in accordance with an embodiment of the present disclosure.
Figure 10B:
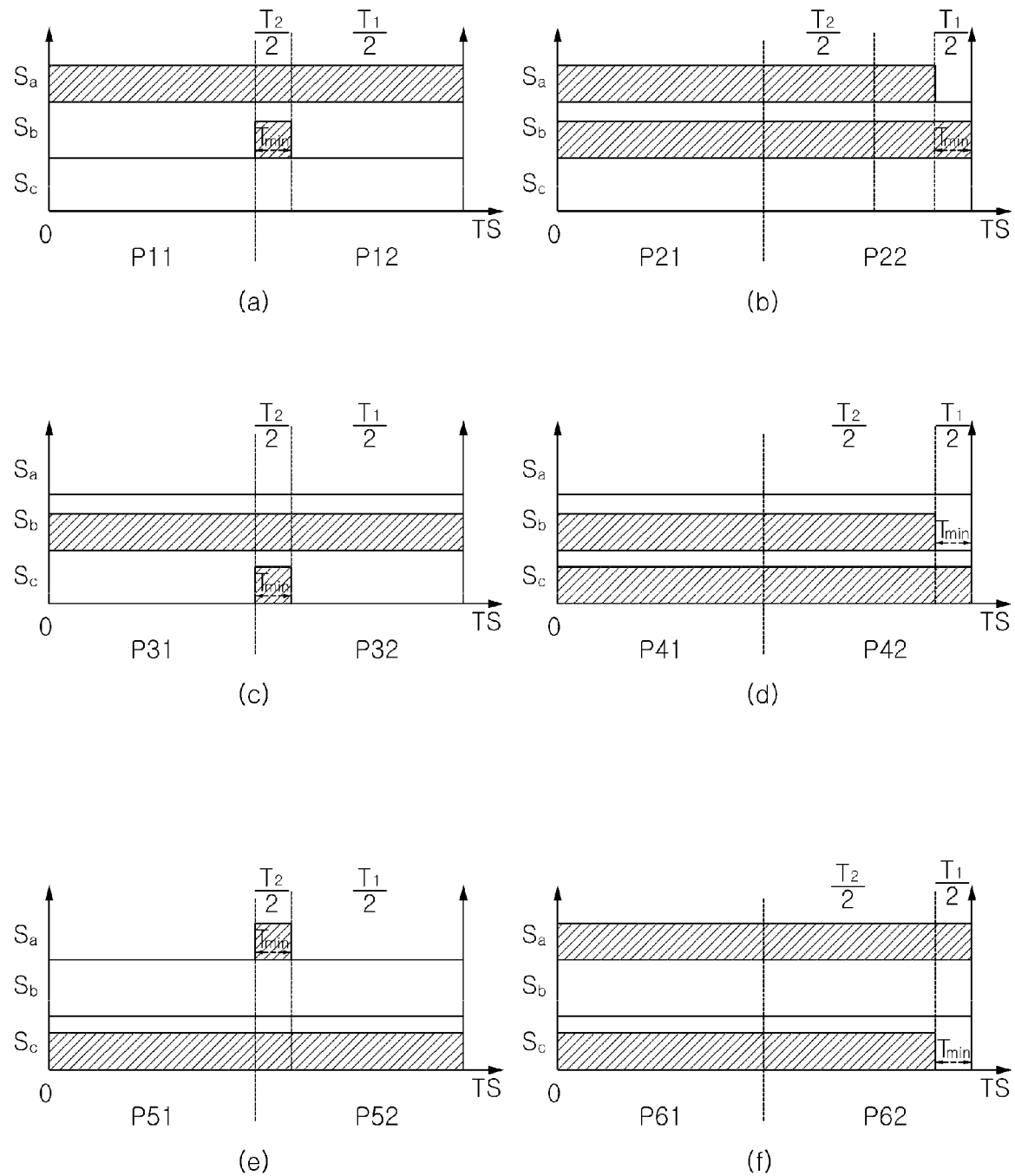

FIGS. 10A and 10B are diagrams illustrating an operation of the motor driving apparatus using the input voltage of the inverter 420 to the maximum, in accordance with an embodiment of the present disclosure.

Referring to FIG. 10A, for example, the inverter controller 430 may sequentially determine the plurality of operating points P11 to P62 for the voltage command v*, on the basis of each of the plurality of sampling points P1 to P6.

In this case, for example, when the plurality of operating points P11 to P62 is determined, the inverter controller 430 may determine the plurality of operating points P11 to P62 so that the operating points P11 to P61 located in the dead band are located in respective vertices of the hexagon of the voltage vector diagram corresponding to the maximum voltage utilization rate.

Referring to FIG. 10B, it can be seen that, in one cycle Ts, only one of the three phases is switched and the other two phases are not switched.

As such, according to various embodiments of the present disclosure, the operation of the inverter 420 may be controlled on the basis of the plurality of sampling points P1 to P6 located in the dead band, in the space vector pulse width variable control, so that the operation control area for the inverter 420 can be expanded without using a flux weakening operating area.

Furthermore, in the space vector pulse width variable control, the voltage utilization rate of the inverter 420 can be enhanced without using a flux weakening operating area.

Figure 11:
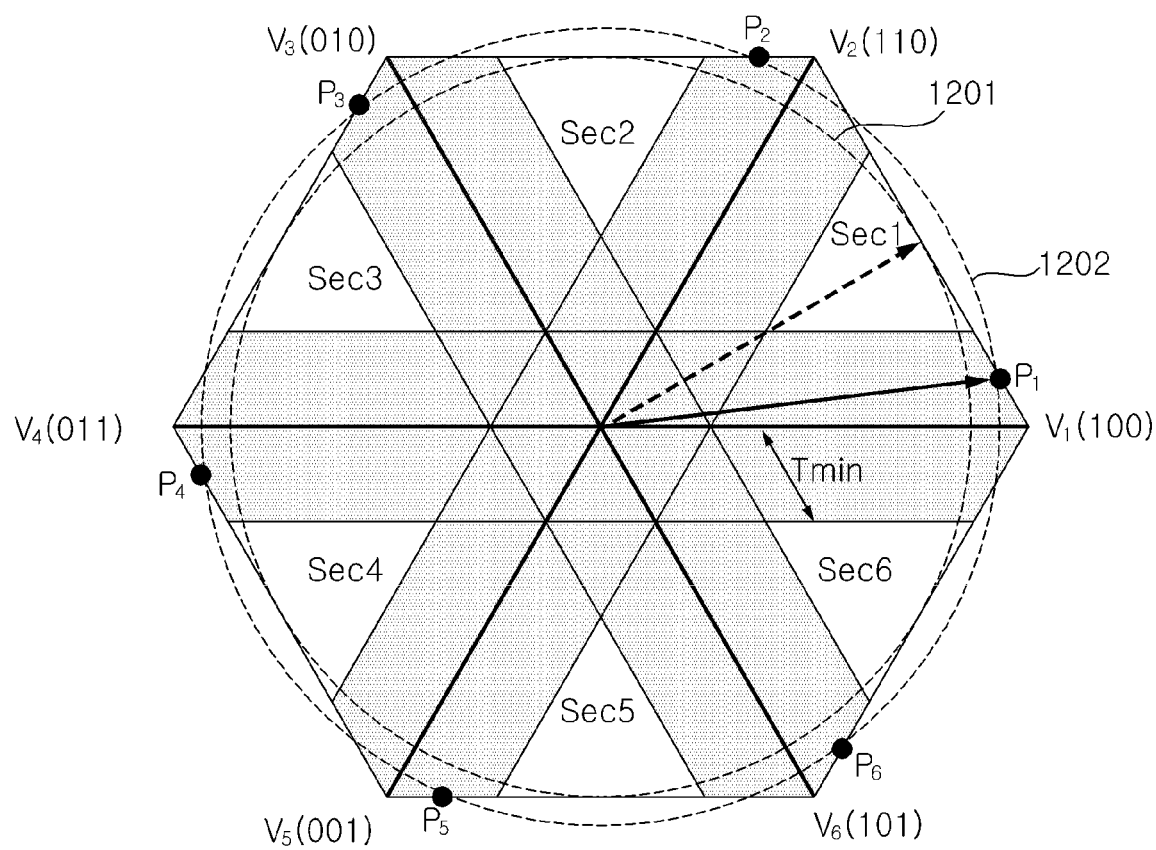
FIG. 11 is a diagram illustrating a voltage utilization rate depending on an operation of the motor driving apparatus, in accordance with an embodiment of the present disclosure.

FIG. 11 is a diagram illustrating a voltage utilization rate depending on an operation of the motor driving apparatus, in accordance with an embodiment of the present disclosure.

Referring to FIG. 11, in the case of the general space vector PWM (SVPWM) control method, it can be seen that the maximum voltage utilization rate is $1/\sqrt{3}$ Vdc corresponding to an inscribed circle of the hexagon of the voltage vector diagram.

However, according to various embodiments of the present disclosure, since the maximum voltage utilization rate corresponds to a circle formed by connecting the plurality of sampling points P1 to P6, this becomes higher in maximum voltage utilization rate as compared with the general space vector PWM (SVPWM) control method.

Meanwhile, according to various embodiments of the present disclosure, since the operation of the inverter 420 is controlled on the basis of the plurality of sampling points P1 to P6 that are preset at predetermined intervals, the harmonic distortion rate for the output current of the motor 230 can be improved.

Figure 12A:
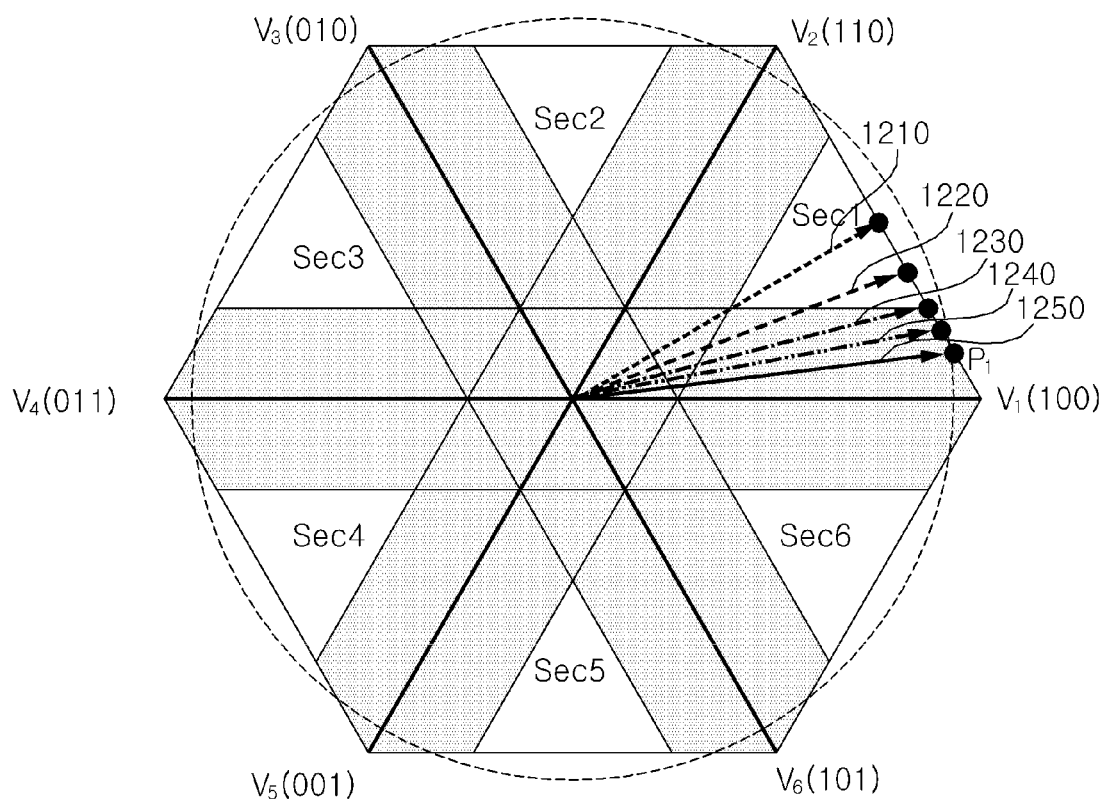
FIGS. 12A and 12B are diagrams illustrating a harmonic distortion rate of an output current depending on the phase of a plurality of sampling points, in accordance with an embodiment of the present disclosure.
Figure 12B:
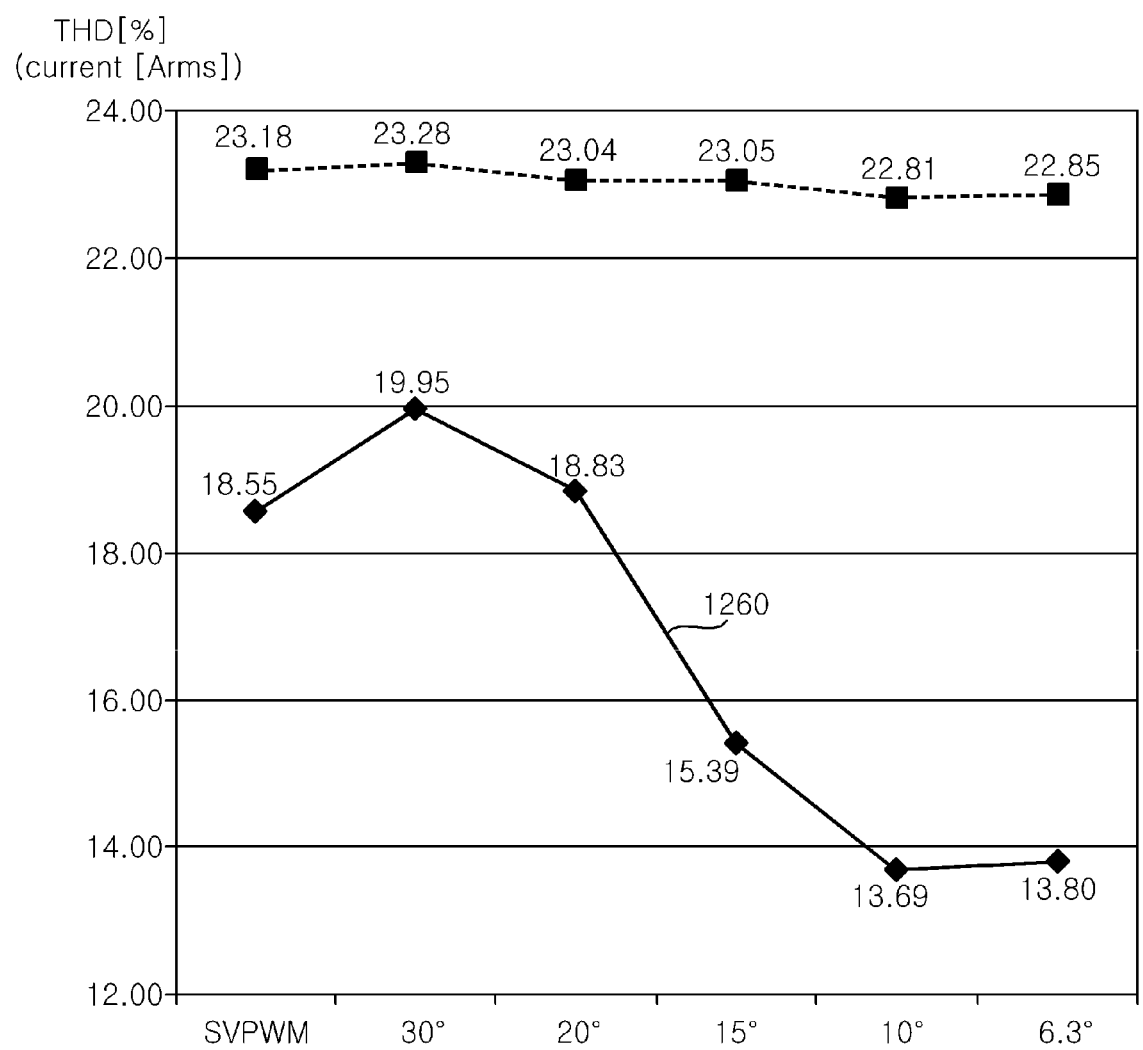

FIGS. 12A and 12B are diagrams illustrating a harmonic distortion rate of an output current depending on the phase θp of a plurality of sampling points P1 to P6, in accordance with an embodiment of the present disclosure.

Referring to FIGS. 12A and 12B, in the case of setting the phase θp of the first sampling point P1 to 30° (1210), 20° (1220), 15° (1230), 10° (1240), and 6.3° (1250) on the basis of the vertices of the hexagon of the voltage vector diagram and the minimum effective vector application time Tmin, changes in output current and harmonic distortion rate of the motor 230 can be confirmed.

According to a graph 1260 for the harmonic distortion rate of FIG. 12B, it can be seen that, as the phase θp of the sampling point P1 is adjusted so that the first sampling point P1 is located in the dead band, the harmonic distortion rate is improved as compared with the general space vector PWM (SVPWM) control method.

The general space vector PWM (SVPWM) control method is problematic in that it uses a weak field control to enhance the voltage utilization rate, so that an iron loss and a copper loss are increased due to an increase in current. In contrast, according to various embodiments of the present disclosure, it is possible to increase the voltage utilization rate of the inverter 420 as compared with the general space vector PWM (SVPWM) control method, while minimizing the weak field control, thus enhancing the output efficiency of the inverter 420 and the motor 230, and reducing the iron loss and the copper loss due to the increase in current.

Figure 13:
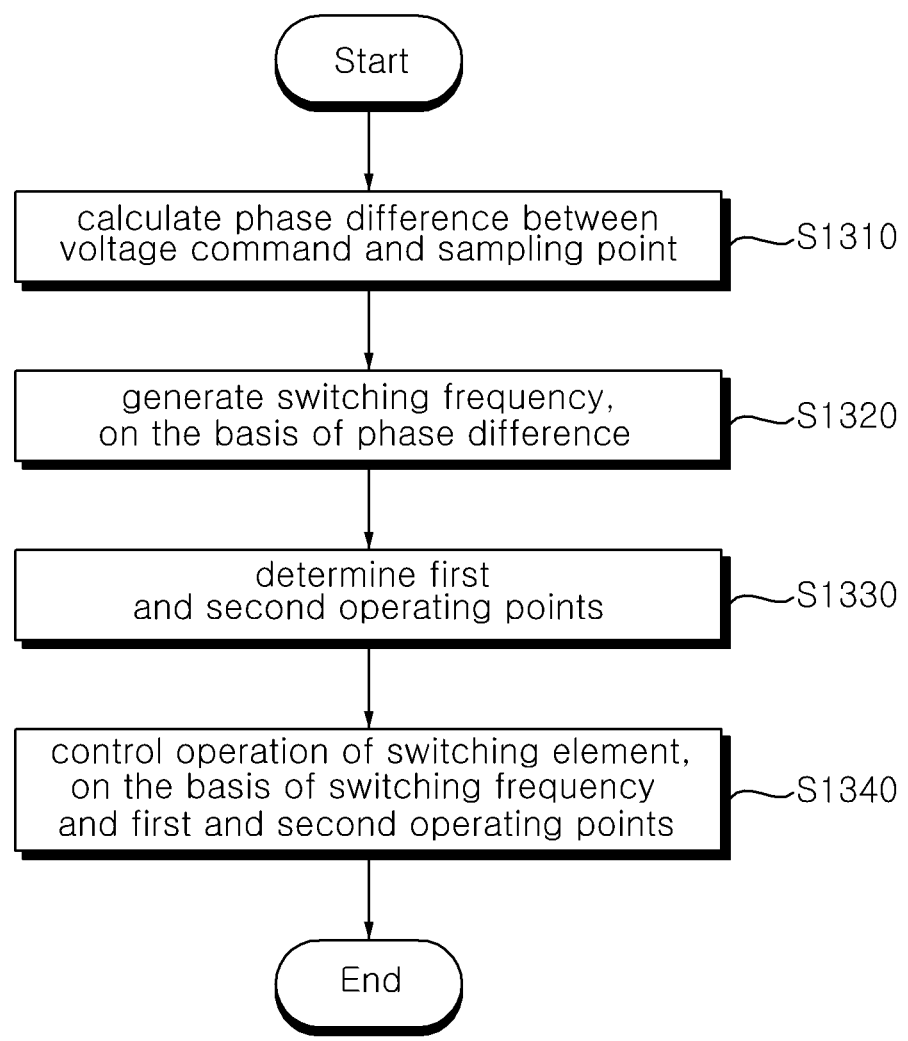
FIG. 13 is a flowchart illustrating a control method of a motor driving apparatus, in accordance with an embodiment of the present disclosure.

FIG. 13 is a flowchart illustrating a control method of a motor driving apparatus 200, in accordance with an embodiment of the present disclosure.

Referring to FIG. 13, the motor driving apparatus 200 may calculate the phase difference θerr between any one of the plurality of sampling points P1 to P6 and the voltage command v* in operation S1310.

When the motor driving apparatus 200 controls, for example, the inverter 420, on the basis of the first sampling point P1 among the plurality of sampling points P1 to P6 according to a preset sequence, the switching-frequency calculator 350 may calculate the phase difference θerr between the voltage command v* and the first sampling point P1.

For example, the switching-frequency calculator 350 may rotatably convert the voltage command v* by the phase θp of the first sampling point P1, and calculate the phase difference θerr between the rotatably converted voltage command v'* and the vector V1 (100), thus calculating the phase difference θerr between the voltage command v* and the first sampling point P1.

The motor driving apparatus 200 may generate the switching frequency fs, on the basis of the calculated phase difference θerr, in operation S1320.

For example, the motor driving apparatus 200 may calculate the variation ΔTs of the switching cycle, on the basis of the rotation speed of the motor 230 and the phase difference θerr. Here, the motor driving apparatus 200 may calculate the switching cycle Ts[n] for the first sampling point P1, on the basis of the previous switching cycle Ts[n−1] and the variation ΔTs of the switching cycle, and generate the switching frequency fs corresponding to the switching cycle Ts[n].

The motor driving apparatus 200 may determine the first and second operating points P11 and P12 on the space vector, on the basis of the level of the voltage command v* and the calculated phase difference θerr, in operation S1330.

For example, the motor driving apparatus 200 may rotatably convert the voltage command v* by the calculated phase difference θerr to correspond to the first sampling point P1, and determine the first and second operating points P11 and P12, in consideration of the level of the voltage command v* and the minimum effective vector application time Tmin.

The motor driving apparatus 200 may control the operation of the plurality of switching elements Sa, S'a, Sb, S'b, Sc, and S'c provided in the inverter 420, in operation S1340, on the basis of the switching frequency fs generated in operation S1320 and the first and second operating points P11 and P12 determined in operation S1330.

For example, as the switching control signal Sic is output according to the pulse width modulation (PWM) method corresponding to the switching frequency fs and the first and second operating points P11 and P12, the plurality of switching elements Sa, S'a, Sb, S'b, Sc, and S'c provided in the inverter 420 may perform the switching operation.

Figure 14A:
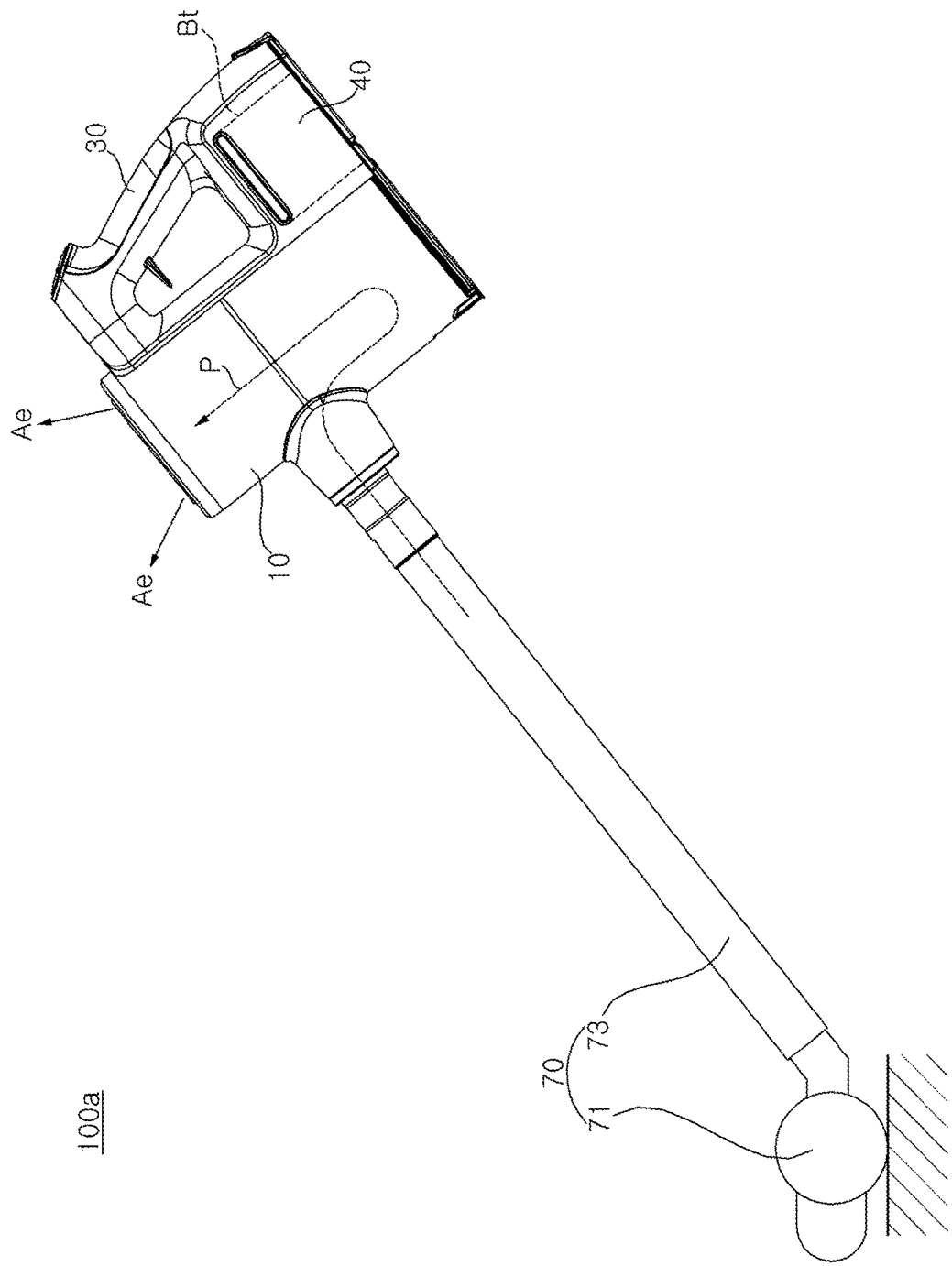
FIGS. 14A to 14C are diagrams illustrating a cleaner that is an example of a home appliance having a motor driving apparatus in accordance with an embodiment of the present disclosure.
Figure 14B:
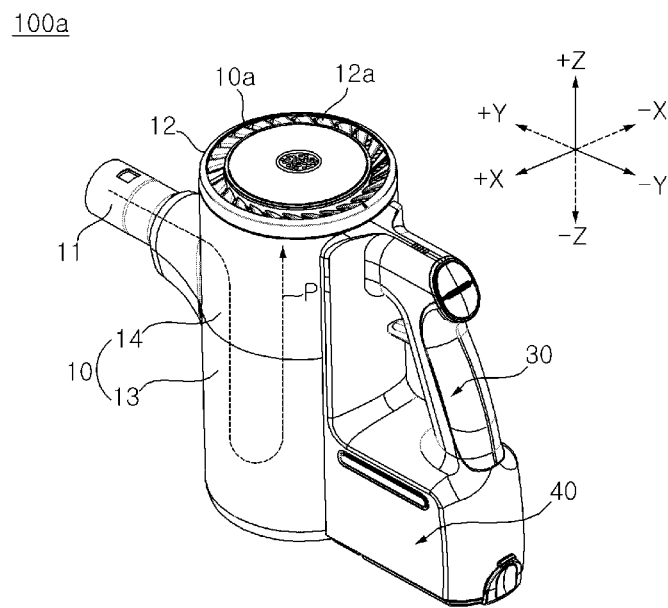
Figure 14C:
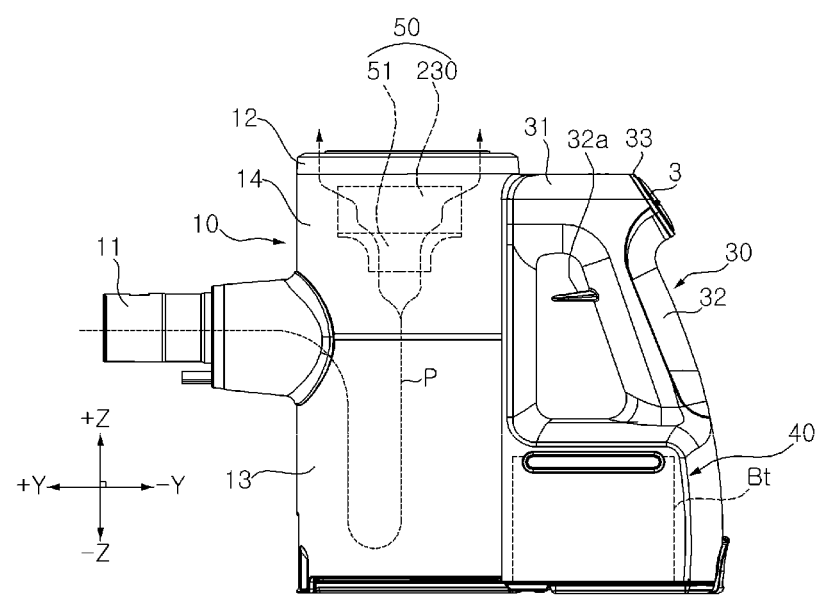

FIGS. 14A to 14C are diagrams illustrating a cleaner that is an example of a home appliance having a motor driving apparatus in accordance with an embodiment of the present disclosure.

FIG. 14A is a side elevation view of a cleaner that is an example of a home appliance in accordance with an embodiment of the present disclosure, FIG. 14B is a perspective view of the cleaner with a nozzle module being detached from FIG. 14A, and FIG. 14C is a side view of the cleaner of FIG. 14B.

Referring to FIGS. 14A to 14C, a cleaner 100a that is an example of a home appliance 100 in accordance with an embodiment of the present disclosure may include, for example, a main body 10 that defines a path P to guide sucked air and thereby discharge the sucked air to an outside, a handle 30 coupled to a rear side of the main body 10, a nozzle module 70 detachably connected to a suction part 11 of the main body 10, a battery Bt (e.g. the battery 215 of FIG. 1) supplying power, a battery housing 40 accommodating the battery Bt therein, and/or a fan module 50 disposed on the path P to move air in the path.

The nozzle module 70 may include, for example, a nozzle part 71 provided to suck external air, and an extension pipe 73 extending long from the nozzle part 71.

The extension pipe 73 may connect the nozzle part 71 and the suction part 11, for example. The extension pipe 73 may guide, for example, air sucked from the nozzle part 71 to introduce the air into the suction path P. One end of the extension pipe 73 may be detachably coupled to the suction part 11 of the main body 10, for example. A user may clean while holding the handle 30 and moving the nozzle part 71 in a state where the nozzle part 71 is placed on a floor.

The main body 10 may include, for example, a discharge cover 12 that forms an exhaust port 10a, a dust collector 13 that stores separated dust, and/or a fan module housing 14 that accommodates the fan module 50 therein.

The discharge cover 12 may form, for example, an upper surface of the main body 10 to cover the top of the fan module housing 14.

The dust collector 13 may be formed in a cylindrical shape, for example. The dust collector 13 may be disposed under the fan module housing 14, for example. Thus, a dust storage space may be formed in the dust collector 13.

For example, the fan module housing 14 may extend upwards from the dust collector 13. The fan module housing 14 may be formed in a cylindrical shape, for example. An extension part 31 of the handle 30 may be disposed on a rear side of the fan module housing 14.

The fan module 50 may be disposed in the fan module housing 14.

The fan module 50 may include, for example, a suction motor 230 that rotates an impeller 51. For example, the suction motor 230 may be positioned above a dust separator 20.

For example, the impeller 51 may be disposed under the suction motor 230. For example, the impeller 51 may be coupled to the suction motor 230 to be rotated by the rotating force of the suction motor 230.

Meanwhile, the impeller 51 may compress the air by rotation, thus allowing the air in the path P to be discharged through the exhaust port 10a, for example.

Meanwhile, the cleaner 100a may include a motor driver (not shown) to control the suction motor 230, for example. The motor driver 220 of the motor driving apparatus 200 may be disposed between the suction motor 230 and the dust collector 13, for example. Meanwhile, the motor driver 220 may be provided with a circuit element disposed on a PCB circuit board, for example.

For example, the handle 30 may extend in a vertical direction and include an additional extension part 32. For example, the additional extension part 32 may be spaced apart from the main body 10 in a horizontal direction. A user may grasp the additional extension part 32 and use the cleaner 100a. For example, an upper end of the additional extension part 32 may be connected to a rear end of the extension part 31. For example, a lower end of the additional extension part 32 is connected to the battery housing 40.

For example, the additional extension part 32 may be provided with a movement limiter 32a so as to prevent the hand from being moved in a longitudinal direction (vertical direction) of the additional extension part 32 in a state where a user grasp the additional extension part 32. For example, the movement limiter 32a may protrude forwards from the additional extension part 32.

For example, the movement limiter 32a may be spaced apart from the extension part 31 in the vertical direction. In a state where a user grasps the additional extension part 32, some fingers of the user's hand may be positioned above the movement limiter 32a, and the remaining fingers may be positioned under the movement limiter 32a.

For example, the handle 30 may include an inclined surface 33 that faces upwards and rearwards. For example, the inclined surface 33 may be positioned on the rear surface of the extension part 31. For example, an input part 3 may be disposed on the inclined surface 33.

For example, the battery Bt may supply power to the fan module 50. For example, the battery Bt may supply power to a noise control module. For example, the battery Bt may be detachably disposed in the battery housing 40.

The battery housing 40 may be, for example, coupled to the rear side of the main body 10. The battery housing 40 may be, for example, disposed under the handle 30. The battery Bt may be, for example, accommodated in the battery housing 40. For example, a heat dissipation hole may be formed in the battery housing 40 to dissipate heat generated from the battery Bt to an outside.

Meanwhile, the exhaust port 10a may be, for example, disposed to face in a specific direction (e.g. upward direction). For example, a plurality of exhaust ports 10a may be divided into each other in a circumferential direction by a plurality of exhaust guides 12a. For example, the plurality of exhaust ports 10a may be spaced apart from each other by a predetermined distance in the circumferential direction.

Figure 15A:
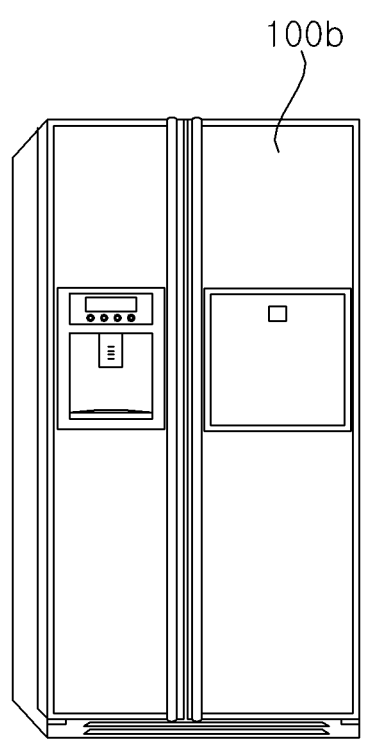
FIGS. 15A to 15C are diagrams illustrating various home appliances each having a motor driving apparatus in accordance with an embodiment of the present disclosure.
Figure 15B:
Figure 15C:
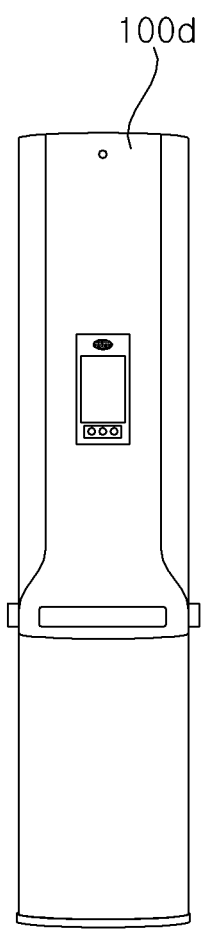

FIGS. 15A to 15C are diagrams illustrating various home appliances each having a motor driving apparatus in accordance with an embodiment of the present disclosure.

FIG. 15A illustrates a refrigerator 100b configured such that a compressor motor (not shown) may be driven by the motor driving apparatus 200, FIG. 15B illustrates a laundry treatment device (washing machine or drier) 100c configured such that a motor (not shown) for rotating a washing tub may be driven by the motor driving apparatus 200, and FIG. 15C illustrates an air conditioner 100d configured such that a compressor motor (not shown) may be driven by the motor driving apparatus 200.

Since the accompanying drawings are merely for easily understanding embodiments disclosed herein, it should be understood that the technical spirit disclosed herein is not limited by the accompanying drawings, and all changes, equivalents or substitutions are included in the spirit and technical scope of the present disclosure.

Likewise, although operations are shown in a specific order in the drawings, it should not be understood that the operations are performed in the specific order shown in the drawings or in a sequential order so as to obtain desirable results, or all operations shown in the drawings are performed. In certain cases, multitasking and parallel processing may be advantageous.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

According to various embodiments of the present disclosure, it is possible to control the operation of an inverter and a motor using one dc-link resistor element, thus increasing price competitiveness as compared with a sensor type motor driving apparatus or a sensorless type motor driving apparatus having a plurality of resistor elements.

Furthermore, according to various embodiments of the present disclosure, an operation control area for an inverter can be expanded without using a flux weakening operating area, in a space vector pulse width variable control using one dc-link resistor element.

Furthermore, according to various embodiments of the present disclosure, switching elements of an inverter are controlled to be switched on the basis of a plurality of operating points that are preset at predetermined intervals in a space vector pulse width variable control, thus enhancing the efficiency of the inverter and improving the harmonic distortion rate.

Furthermore, according to various embodiments of the present disclosure, it is possible to improve the voltage utilization rate of an inverter while minimizing a weak field control, thus improving the output efficiency of the inverter and a motor and reducing an iron loss and a copper loss due to an increase in current.

What is claimed is:
1. A motor driving apparatus, comprising:
a dc-link capacitor configured to store direct current (DC) power;
an inverter that includes a plurality of switching elements, and that is configured to convert the DC power stored in the dc-link capacitor into alternating current (AC) power and output the AC power to a motor;
a dc-link resistor element located between the dc-link capacitor and the inverter; and
a controller configured to, based on a space vector pulse width variable control, output at least one signal to control operations of the inverter,
wherein the controller is further configured to:
calculate a phase difference between a first sampling point among a plurality of sampling points that are preset for the space vector and a voltage command vector,
generate, based on the calculated phase difference, a switching frequency,
determine, based on a level of the voltage command vector and the calculated phase difference, a first operating point located in a dead band in which a current flowing through the dc-link resistor is undetectable, and a second operating point located at a boundary or outside of the dead band, and sequentially output a signal corresponding to the first operating point and a signal corresponding to the second operating point in a switching cycle corresponding to the switching frequency,
wherein the plurality of sampling points are preset based on the boundary of the dead band and a plurality of effective voltage vectors, and
wherein a phase of an average of a voltage vector corresponding to the first operating point and a voltage vector corresponding to the second operating point corresponds to a phase of the first sampling point.

2. The motor driving apparatus of claim 1, wherein the plurality of sampling points are located between the boundary of the dead band and the plurality of effective voltage vectors on each side of a hexagon of a space vector-based voltage vector diagram, and
wherein the plurality of sampling points are each preset at predetermined intervals from each other.

3. The motor driving apparatus of claim 1, wherein the controller is configured to:
calculate, based on the current flowing through the dc-link resistor element, a phase current flowing through the motor,
calculate, based on the calculated phase current, a rotation speed of the motor, and
generate, based on the calculated rotation speed of the motor and the calculated phase difference, the switching frequency.

4. The motor driving apparatus of claim 3, wherein the controller is configured to:
calculate, based on the calculated rotation speed of the motor and the calculated phase difference, a cycle variation, and
generate, based on a previous switching cycle and the calculated cycle variation, the switching frequency.

5. The motor driving apparatus of claim 1, wherein the controller is configured to control the inverter according to a maximum voltage utilization rate by:
determining, based on a level of a voltage stored in the dc-link capacitor and one of the plurality of effective voltage vectors according to the first sampling point, the first operating point.

6. The motor driving apparatus of claim 5, wherein the first operating point is located at a vertex of a hexagon of a voltage vector diagram.

7. The motor driving apparatus of claim 6, wherein the controller is configured to determine, based on a minimum effective vector application time, the second operating point that is located at the boundary of the dead band.

8. The motor driving apparatus of claim 1, wherein, based on a level of the voltage command being constant, a ratio of time for detecting one of phase currents flowing through the motor and a time for detecting another one of the phase currents flowing through the motor is constant for each switching cycle.

9. The motor driving apparatus of claim 3, wherein the controller comprises:
a phase-current detector configured to calculate, based on the current flowing through the dc-link resistor element, the phase current flowing through the motor;
a speed calculator configured to calculate, based on the calculated phase current, the rotation speed of the motor;
a current-command generator configured to generate, based on the calculated rotation speed of the motor and a speed command value, a current command value;
a voltage-command generator configured to generate, based on the current command value and the calculated phase current, the voltage command;
a switching-frequency calculator configured to generate, based on the voltage command and the calculated rotation speed of the motor, the switching frequency; and
a switching-control-signal output device configured to output, based on the generated switching frequency, the at least one signal.

10. A control method, comprising:
calculating, by a controller, a phase difference between a first sampling point among a plurality of sampling points preset for a space vector and a voltage command vector;
generating, by the controller and based on the calculated phase difference, a switching frequency;
determining, by the controller and based on a level of the voltage command vector and the calculated phase difference, a first operating point located in a dead band in which a current flowing through a dc-link resistor of the controller is undetectable, and a second operating point located at a boundary or outside of the dead band; and
sequentially outputting a signal corresponding to the first operating point and a signal corresponding to the second operating point in a switching cycle corresponding to the switching frequency,
wherein the plurality of sampling points are preset based on the boundary of the dead band and a plurality of effective voltage vectors,
wherein a phase of an average of a voltage vector corresponding to the first operating point and a voltage vector corresponding to the second operating point corresponds to a phase of the first sampling point.

11. The control method of claim 10, wherein the plurality of sampling points are located between the boundary of the dead band and the plurality of effective voltage vectors on each side of a hexagon of a space vector-based voltage vector diagram, and
wherein the plurality of sampling points are each preset at predetermined intervals from each other.

12. The control method of claim 10, wherein generating the switching frequency comprises:
calculating, based on the current flowing through a dc-link resistor element, a phase current flowing through a motor, wherein the dc-link resistor element is located between a dc-link capacitor storing direct current (DC) power and an inverter;
calculating, based on the calculated phase current, a rotation speed of the motor; and
generating, based on the calculated rotation speed of the motor and the calculated phase difference, the switching frequency.

13. The control method of claim 12, wherein generating the switching frequency further comprises:
calculating, based on the calculated rotation speed of the motor and the calculated phase difference, a cycle variation, and
generating, based on a previous switching cycle and the calculated cycle variation, the switching frequency.

14. The control method of claim 11, wherein determining the first and the second operation points includes controlling an inverter according to a maximum voltage utilization rate by:
determining, based on a level of a voltage stored in a dc-link capacitor of the controller and one of the plurality of effective voltage vectors according to the first sampling point, the first operating point.

15. The control method of claim 14, wherein the first operating point is located at a vertex of a hexagon of a voltage vector diagram.

16. The control method of claim 15, wherein determining the first and the second operation points comprises determining, based on a minimum effective vector application time, the second operating point that is located at the boundary of the dead band.

17. The control method of claim 10, wherein, based on a level of the voltage command being constant, a ratio of time for detecting one of phase currents flowing through a motor and a time for detecting another one of the phase currents flowing through the motor is constant for each switching cycle.

18. The control method of claim 12, further comprising:
    calculating, by a phase-current detector of the controller and based on the current flowing through a dc-link resistor element of the controller, the phase current flowing through the motor;
    calculating, by a speed calculator of the controller and based on the calculated phase current, the rotation speed of the motor;
    generating, by a current-command generator of the controller and based on the calculated rotation speed of the motor and a speed command value, a current command value;
    generating, by a voltage-command generator of the controller and based on the current command value and the calculated phase current, the voltage command;
    generating, by a switching-frequency calculator of the controller and based on the voltage command and the calculated rotation speed of the motor, the switching frequency; and
    outputting, by a switching-control-signal output device of the controller and based on the generated switching frequency, at least one signal to control operations of an inverter.

* * * * *